US012676015B2

(12) United States Patent
Li et al.

(10) Patent No.: US 12,676,015 B2
(45) Date of Patent: Jul. 7, 2026

(54) HIGH DIMENSIONAL SPATIAL ANALYSIS

(71) Applicant: Genentech, Inc., South San Francisco, CA (US)

(72) Inventors: Xiao Li, Foster City, CA (US); Darya Yuryevna Orlova, Los Altos, CA (US); Joaquin Pechuan Jorge, San Francisco, CA (US); Rajiv Edillon Jesudason, Oakland, CA (US)

(73) Assignee: GENENTECH, INC., South San Francisco, CA (US)

( * ) Notice: Subject to any disclaimer, the term of this patent is extended or adjusted under 35 U.S.C. 154(b) by 298 days.

(21) Appl. No.: 18/491,609

(22) Filed: Oct. 20, 2023

(65) Prior Publication Data

US 2024/0046671 A1     Feb. 8, 2024

Related U.S. Application Data

(63) Continuation of application No. PCT/US2022/025979, filed on Apr. 22, 2022.

(60) Provisional application No. 63/179,105, filed on Apr. 23, 2021.

(51) Int. Cl.
*G06K 9/00* (2022.01)
*G06T 7/11* (2017.01)
*G06V 20/69* (2022.01)

(52) U.S. Cl.
CPC .............. *G06V 20/698* (2022.01); *G06T 7/11* (2017.01); *G06T 2207/10056* (2013.01)

(58) Field of Classification Search
None
See application file for complete search history.

(56) References Cited

U.S. PATENT DOCUMENTS

| | | | |
|---|---|---|---|
| 2016/0341731 A1 | 11/2016 | Sood et al. | |
| 2018/0204085 A1* | 7/2018 | Chennubhotla | ....... G06T 7/0012 |
| 2021/0090694 A1 | 3/2021 | Colley et al. | |

OTHER PUBLICATIONS

An, D. et al. (2018). "Isoform Sequencing and State-of-Art Applications for Unravelling Complexity of Plant Transcriptomes," Genes 9(43):1-15.

(Continued)

*Primary Examiner* — S J Park
(74) *Attorney, Agent, or Firm* — MORRISON & FOERSTER LLP

(57)     ABSTRACT

A method for high dimensional spatial analysis includes segmenting, into a plurality of segments, an image depicting a plurality of cells comprising a biological sample. Each segment of the plurality of segments may correspond to one cell of the plurality of cells. A phenotype for each cell of the plurality of cells depicted in the image may be determined based on the segmented image. The determining of the phenotype may include identifying, within the plurality of cells, a first cell type having a first phenotype and a second cell type having a second phenotype. One or more metrics, such as a colocation quotient or an Earth Mover's Distance, quantifying a co-occurrence pattern between the first cell type and the second cell type may be determined. A visual representation of the co-occurrence pattern between the first cell type and the second cell type may be generated based on the metric.

39 Claims, 25 Drawing Sheets

(56)　　　　　References Cited

OTHER PUBLICATIONS

Andreas, A.I. et al. (Jan. 2, 2018). "Mobius Assembly: A Versatile Golden-Gate Framework Towards Universal DNA Assembly," PLoS One 13(1):e0189892, 18 pages.

Anonymous (Sep. 7, 2018). "PhenomapTM Multiplexing Software Tool Visiopharm A/S-[LSE] Life-Sciences-Europe.com—The European Life Sciences Web Portal," retrieved from the Internet: https://www.life-sciences-europe.com/product/phenomap-multiplexing-software-tool-visiopharm-group-image-analysis-2001-29923.html, last visited Dec. 13, 2023, 4 pages.

Ardui, S. et al. (2018, e-pub. Feb. 1, 2018). "Survey and Summary. Single Molecule Real-Time (SMRT) Sequencing Comes of Age: Applications and Utilities for Medical Diagnostics" Nucleic Acids Research 46(5):2159-2168.

Arnol, D. et al. (2019, e-pub. Oct. 1, 2019). "Modeling Cell-Cell Interactions from Spatial Molecular Data with Spatial Variance Component Analysis," Cell Rep. 29(1):202-211.

Barnes, W.M. (Mar. 1994). "PCR Amplification of Up to 35-kb DNA With High Fidelity and High Yield from λ Bacteriophage Templates," Proc. Natl. Acad. Sci. USA 91:2216-2220.

Beaucage, S.L. et al. (1992). "Advances In The Synthesis Of Oligonucleotides By The Phosphoramidite Approach," Tetrahedron 48(12):2223-2311.

Bentley, D.R. et al. (Nov. 6, 2008). "Accurate Whole Human Genome Sequencing Using Reversible Terminator Chemistry," Nature 456:53-59, 20 pages.

Bernas, T. et al. (2008). "Quadratic Form: A Robust Metric for Quantitative Comparison of Flow Cytometric Histograms," Cytometry Part A 73A:716-726.

Cetin, A.E. et al. (Feb. 28, 2018). "Plasmonic Sensor Could Enable Label-Free DNA Sequencing," ACS Sensors 3(3):561-568, 8 pages.

Crozet, P. et al. (2018). "Birth of a Photosynthetic Chassis: A MoClo Toolkit Enabling Synthetic Biology in the Microalga Chlamydomonas Reinhardtii," ACS Synthetic Biology 7(9):2074-2086, 38 pages.

Dries, R. et al. (2020). "Giotto, A Toolbox for Integrative Analysis and Visualization of Spatial Expression Data," BioRxiv 37 pages.

International Preliminary Report on Patentability, issued Oct. 24, 2023, for PCT Application No. PCT/US2022/025979, filed Apr. 22, 2022, 9 pages.

International Search Report and Written Opinion, mailed Jul. 25, 2022, for PCT Application No. PCT/US2022/025979, filed Apr. 22, 2022, 13 pages.

Ji, A.L. et al. (Jul. 23, 2020). "Multimodal Analysis of Composition and Spatial Architecture in Human Squamous Cell Carcinoma," Cell 182:497-514.

Keren, L. et al. (Sep. 6, 2018). "A Structure Tumor-Immune Microenvironment in Triple Negative Breast Cancer Revelated by Multiplexed Ion Beam Imaging," Cell 174(6):3373-3387.

Li, X. et al. (2020). "1381P. Spatial-Statistics-Based Modeling for Predicting Treatment Response in Non-Small Cell Lung Cancer (NSCLC) Patients using H&E Pathology Images," Annals of Oncology 31(54):S879.

Li, X. et al. (2025). "SPEX: A Modular End-to-End Platform for High-Plex Tissue Spatial Omics Analysis" GigaScience 14:1-16.

Roederer, M. et al. (2001). "Frequent Difference Gating: A Multivariate Method For Identifying Subsects That Differ Between Samples," Cytometry 45:56-64.

Rogers, W.T. et al. (2008, e-pub. Mar. 27, 2008). "Cytometric Fingerprinting: quantitative Characterization of multivariate Distributions," Cytometry Part A 73A:430-441.

Schaprio, D. et al. (Sep. 2017). "miCAT: A Toolbox for Analysis of Cell Phenotypes and Interactions in Multiplex Image Cytometry Data," 14(9):873-876, 14 pages.

Somarkis, A. et al. (Jan. 2021, e-pub. Jul. 29, 2019). "ImaCytE: Visual Exploration of Cellular Micro-Environments for Imaging Mass Cytometry Data," IEEE Transactions on Visualization and Computer Graphics 27(1):98-110.

Spagnolo, D.M. et al. (Nov. 29, 2016). "Pointwise Mutual Information Quantifies Intratumor Heterogeneity in Tissue Sections Labeled with Multiple Fluorescent Biomarkers," Journal of Pathology Informatics 1:47, 18 pages.

* cited by examiner

1X
Magnification

10X
Magnification

40X
Magnification

135

| Phenotype | Cell-cell Interaction | 440b Selection | |
|---|---|---|---|
| ▢Column Selection | | | |
| Cluster | Zone | Classification | Expression Pattern |
| 180 | Germinal Center | Stromal fibroblasts | Ki67 +/-, Collagen+ |
| 844 | Germinal Center | GC "Dark Zone" | Ki67 +/-, BCL2-, CD45 low |
| 228 | Germinal Center | GC "Transition" | Ki67 +/low, BCL2-, CD45 low |
| 275 | Germinal Center | GC "Light Zone" | Ki67 low, BCL2 low, CD45 low |
| 85 | Germinal Center | GC macrophages | CD68+, CD20 (by contamination?) |
| 749 | | Macrophages | CD68+ |
| 891 | Mantle Zone a... | Stromal fibroblasts and e... | CD31 +/-, Collagen+ |
| 939 | Mantle Zone a... | T Cells | BCL2+, CD8+, CD20 low |
| 769 | Mantle Zone a... | Mantle zone | BCL2+, CD20+ |
| 322 | Mantle Zone a... | GC "cap" | BCL2+, CD20+, CD8- |
| 512 | Epithelium | Squamous epithelium | CK+, TIM3+ |
| 370 | Epithelium | Squamous epithelium | CK+, TIM3 high |
| 559 | Epithelium | Vascular Endothelium | CD31+, PD-L1+ |
| 702 | Epithelium | Squamous epithelium | CK+, CD20 high |
| 417 | Epithelium | Proliferating epithelial cells | CK+, Ki67+ |
| 654 | Epithelium | Lymphoepithelial | CD68+ or CD8+, CK high |

| 133 | Epithelium | Macrophages | CD68+, PD-L1 high | Cell B |

▯Mode 2

430
Heatmap

Cluster1 (y-axis): 939, 891, 85, 844, 796, 749, 702, 654, 607, 559, 512, 465, 417, 370, 322, 275, 228, 180, 133

Cluster1 (x-axis): 939, 891, 85, 844, 796, 749, 702, 654, 607, 559, 512, 465, 417, 370, 322, 275, 228, 180, 133

FIG. 4A CONT.

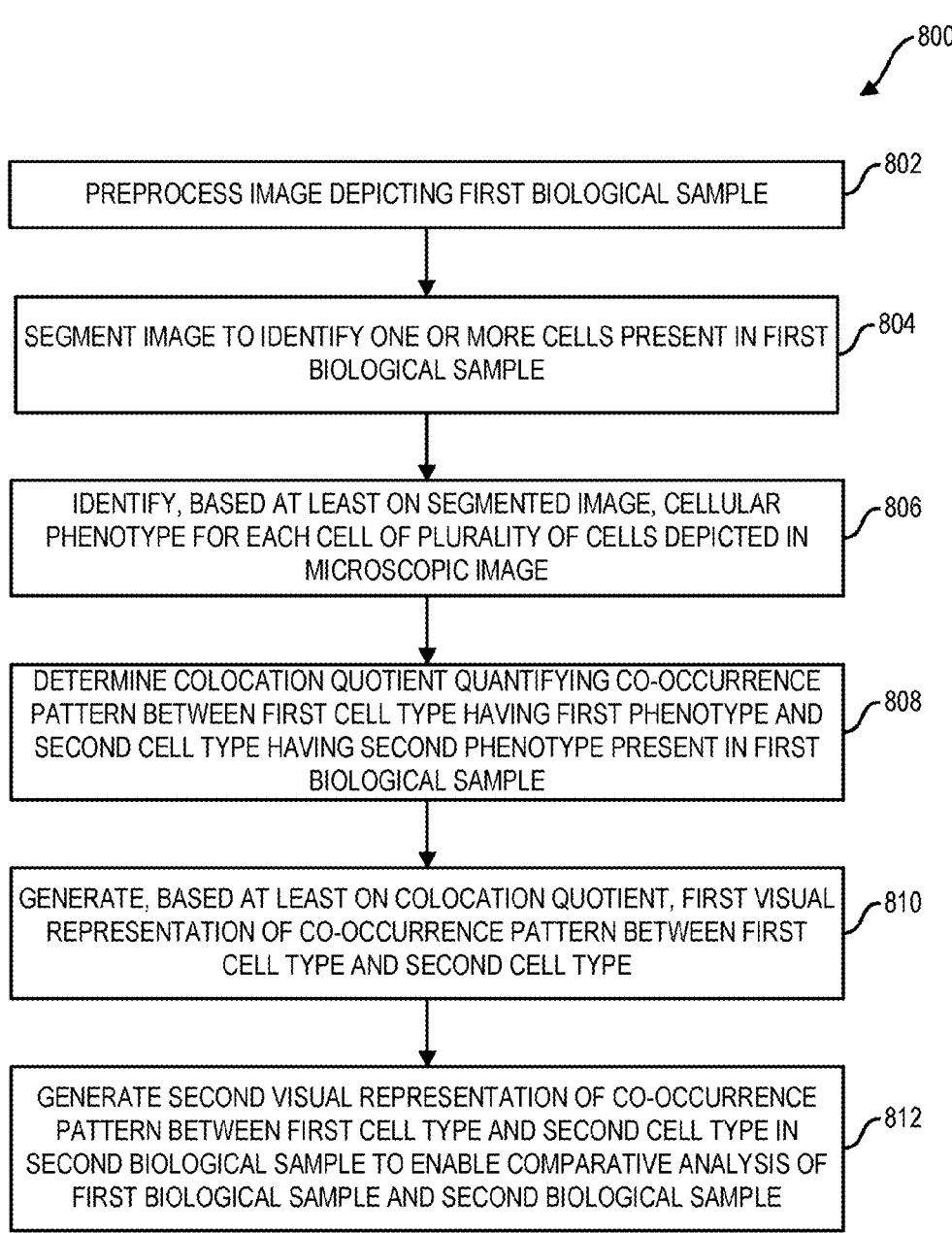

800

PREPROCESS IMAGE DEPICTING FIRST BIOLOGICAL SAMPLE ⌐802

SEGMENT IMAGE TO IDENTIFY ONE OR MORE CELLS PRESENT IN FIRST BIOLOGICAL SAMPLE ⌐804

IDENTIFY, BASED AT LEAST ON SEGMENTED IMAGE, CELLULAR PHENOTYPE FOR EACH CELL OF PLURALITY OF CELLS DEPICTED IN MICROSCOPIC IMAGE ⌐806

DETERMINE COLOCATION QUOTIENT QUANTIFYING CO-OCCURRENCE PATTERN BETWEEN FIRST CELL TYPE HAVING FIRST PHENOTYPE AND SECOND CELL TYPE HAVING SECOND PHENOTYPE PRESENT IN FIRST BIOLOGICAL SAMPLE ⌐808

GENERATE, BASED AT LEAST ON COLOCATION QUOTIENT, FIRST VISUAL REPRESENTATION OF CO-OCCURRENCE PATTERN BETWEEN FIRST CELL TYPE AND SECOND CELL TYPE ⌐810

GENERATE SECOND VISUAL REPRESENTATION OF CO-OCCURRENCE PATTERN BETWEEN FIRST CELL TYPE AND SECOND CELL TYPE IN SECOND BIOLOGICAL SAMPLE TO ENABLE COMPARATIVE ANALYSIS OF FIRST BIOLOGICAL SAMPLE AND SECOND BIOLOGICAL SAMPLE ⌐812

FIG. 8A

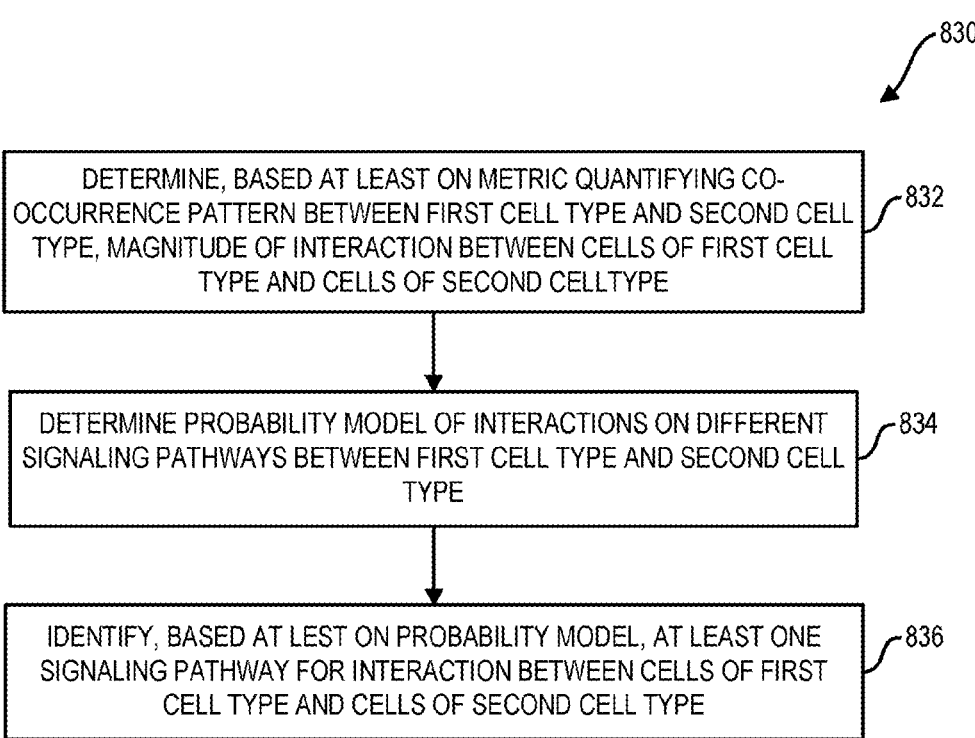

830

DETERMINE, BASED AT LEAST ON METRIC QUANTIFYING CO-OCCURRENCE PATTERN BETWEEN FIRST CELL TYPE AND SECOND CELL TYPE, MAGNITUDE OF INTERACTION BETWEEN CELLS OF FIRST CELL TYPE AND CELLS OF SECOND CELLTYPE                    832

DETERMINE PROBABILITY MODEL OF INTERACTIONS ON DIFFERENT SIGNALING PATHWAYS BETWEEN FIRST CELL TYPE AND SECOND CELL TYPE                    834

IDENTIFY, BASED AT LEST ON PROBABILITY MODEL, AT LEAST ONE SIGNALING PATHWAY FOR INTERACTION BETWEEN CELLS OF FIRST CELL TYPE AND CELLS OF SECOND CELL TYPE                    836

FIG. 8B

HIGH DIMENSIONAL SPATIAL ANALYSIS

CROSS REFERENCE TO RELATED APPLICATION

This application is a continuation of International Application No. PCT/US2022/025979, filed on Apr. 22, 2022, which claims priority to U.S. Provisional Application No. 63/179,105, entitled "HIGH DIMENSIONAL SPATIAL ANALYSIS" and filed on Apr. 23, 2021, the disclosure of which is incorporated herein by reference in its entirety.

TECHNICAL FIELD

The subject matter described herein relates generally to digital image analysis and more specifically to a spatial analysis of high dimensional imaging and spatial transcriptomic data.

BACKGROUND

Digital pathology incorporates digital imaging into the practice of pathology in which diseases are investigated and diagnosed through the examination of biological samples such as tissue fragments, free cells, body fluids, and/or the like. Whereas a non-digital pathology workflow relies on glass specimen slides, a digital pathology workflow may include digitizing the glass specimen slides to generate digital pathology images for subsequent viewing and analysis. Biological samples of tissues, cells, and/or body fluids may provide an abundance of information on disease morphology, progression, and response at a cellular level. Digitizing the glass specimen slides may render this information more accessible for interpretation, management, integration, and sharing. Thus, in addition to optimizing diagnosis and clinical decisions, digital pathology may also improve patient monitoring, disease progression prediction, treatment response and prediction, personalized healthcare, dosing recommendations, and/or the like.

SUMMARY

Systems, methods, and articles of manufacture, including computer program products, are provided for high dimensional spatial analysis. In some example embodiments, there is provided a system that includes at least one processor and at least one memory. The at least one memory may include program code that provides operations when executed by the at least one processor. The operations may include: segmenting, into a plurality of segments, an image depicting a plurality of cells comprising a first biological sample, each segment of the plurality of segments corresponding to one cell of the plurality of cells; determining, based at least on the segmented image, a phenotype for each cell of the plurality of cells depicted in the image, the determining of the phenotype includes identifying, within the plurality of cells, a first cell type having a first phenotype and a second cell type having a second phenotype; determining a metric quantifying a co-occurrence pattern between the first cell type and the second cell type; and generating, based at least on the metric, a visual representation of the co-occurrence pattern between the first cell type and the second cell type.

In some variations, one or more features disclosed herein including the following features can optionally be included in any feasible combination. The phenotype for each cell of the plurality of cells may be determined by applying a dimensionality reduction technique including a principal component analysis (PCA), a uniform manifold approximation and projection (UMAP), and/or a T-distributed Stochastic Neighbor Embedding (t-SNE).

In some variations, the phenotype for each cell of the plurality of cells may be determined by applying a cluster analysis technique including a k-means clustering, a mean-shift clustering, a density-based spatial clustering of applications with noise (DBSCAN), an expectation-maximization (EM) clustering using Gaussian mixture models (GMM), and an agglomerative hierarchical clustering.

In some variations, the phenotype for each cell of the plurality of cells may be determined by based at least on a protein and/or a gene expressed by each cell of the plurality of cells.

In some variations, the metric may include a colocation quotient determined by applying a machine learning model trained to quantify a spatial distribution between the first cell type, the second cell type, and a third cell type having a third phenotype that is also present within the plurality of cells.

In some variations, the metric may include a colocation quotient is determined by at least determining a local density of cells of the first cell type that are spatially proximate to cells of the second cell type and a global density of cells of the first cell type that are spatially proximate to cells of the second cell type. The colocation quotient may correspond to a ratio of the local density relative to the global density.

In some variations, the metric may include an Earth Mover's Distance (EMD) quantifying a difference in a first spatial distribution of cells of the first cell type and a second spatial distribution of cells of the second cell type.

In some variations, the operations may further include determining, based at least on the metric, a magnitude of an interaction between cells of the first cell type and cells of the second cell type.

In some variations, the interaction may include intercellular signaling by an endothelial growth factor (EGF) pathway, a vascular endothelial growth factor (VEGF) pathway, a growth arrest specific (GAS) pathway, a cadherin (CDH) pathway, and/or a cadherin 5 (CDH5) pathway.

In some variations, the operations may further include identifying, based at least on a probability model, at least one signaling pathway for the interaction between the first cell type and the second cell type. The probability model may be determined based on a magnitude of interactions on different signaling pathways between the first cell type and the second cell type observed in control samples having various spatial permutations of the first cell type and the second cell type.

In some variations, the metric may include a global value applicable to the plurality of cells depicted in the image.

In some variations, the metric may include a local value applicable to a subset of the plurality of cells depicted in the image.

In some variations, the subset of the plurality of cells may be determined based on a radius specified by one or more user inputs.

In some variations, the operations may further include determining, for each of a plurality of reference samples, a reference metric. The plurality of reference samples may include a plurality of distributions of the first cell type and the second cell type. The reference metric may quantify the co-occurrence pattern between the first cell type and the second cell type present in each of the plurality of reference samples.

In some variations, the first cell type and the second cell type may be determined to exhibit a statistically significant attractive co-occurrence pattern based at least on the metric of the first biological sample exceeding the reference metric of more than a threshold quantity of the plurality of reference samples.

In some variations, the first cell type and the second cell type may be determined to exhibit a statistically significant avoidance co-occurrence pattern based at least on the metric of the first biological sample being less than the reference metric of more than a threshold quantity of the plurality of reference samples.

In some variations, the first cell type and the second cell type may be determined to exhibit a statistically insignificant co-occurrence pattern based at least on the metric of the first biological sample exceeding the reference metric or being less than the reference metric of less than a threshold quantity of the plurality of reference samples.

In some variations, the visual representation may include a heatmap including one or more visual indicators corresponding to a type and/or a magnitude of the co-occurrence pattern between the first cell type and the second cell type.

In some variations, the heatmap may include a first visual indicator corresponding to cells of the first cell type, a second visual indicator corresponding to cells of the second cell type that exhibit an attractive co-occurrence pattern relative to cells of the first cell type, and a third visual indicator corresponding to cells of the second cell type that exhibit an avoidance co-occurrence pattern relative to cells of the first cell type.

In some variations, the first visual indicator, the second visual indicator, and the third visual indicator may be associated with a different color, shape, and/or size.

In some variations, the second visual indicator may correspond to cells of the second cell type that exhibit an above-threshold attractive co-occurrence pattern relative to cells of the first cell type. The heatmap may further include a fourth visual indicator corresponding to cells of the second cell type that exhibit a below-threshold attractive co-occurrence pattern relative to cells of the first cell type.

In some variations, the third visual indicator may correspond to cells of the second cell type that exhibit an above-threshold avoidance co-occurrence pattern relative to cells of the first cell type. The heatmap may further include a fourth visual indicator corresponding to cells of the second cell type that exhibit a below-threshold avoidance co-occurrence pattern relative to cells of the first cell type.

In some variations, the first visual indicator, the second visual indicator, and the third visual indicator may be superimposed over the image depicting the plurality of cells.

In some variations, the visual representation may be generated by applying one or more dimensionality reduction techniques such that the visual representation includes a first cell cluster corresponding to the first cell type and a second cell cluster corresponding to the second cell type.

In some variations, the content of the visual representation may be determined based on one or more inputs selecting a portion of the image including a subset of the plurality of cells.

In some variations, the one or more inputs may select the portion of the image by at least specifying a zoom, a magnification level, and/or a field of view associated with the visual representation.

In some variations, the operations may further include generating another visual representation of the co-occurrence pattern between the first cell type and the second cell type present in a second biological sample.

In some variations, the first biological sample may be a control sample and the second biological sample may be a treated sample.

In some variations, the first biological sample may be subjected to a first treatment and the second biological sample may be subjected to a second treatment.

In some variations, the operations may further include preprocessing the image to convert the image from a first format to a second format, the first format being associated with an imaging system generating the image, and the second format being a non-proprietary, vendor independent format.

In some variations, the first format may be an imaging mass cytometry (IMC) format and the second format may be an Open Microscopy Environment Tag Image File Format COME TIFF) and/or a Tag Image File Format (TIFF).

In some variations, the preprocessing of the image may further include converting the image in the second format to a third format comprising a multichannel array.

In some variations, the preprocessing of the image may include at least one of a global background correction and a denoising.

In some variations, the image may be segmented by applying a machine learning model trained to perform per-cell segmentation by at least assigning, to each pixel in the image, a cell segmentation label indicating whether the pixel is a part of a background of the image or a part of a cell depicted in the image.

In some variations, the segmenting of the image may further include applying one or more rule-based functions to identify, based at least on morphology, a false positive cell segmentation label assigned to a pixel depicting a non-cellular structure.

In some variations, the segmenting of the image may further include replacing the false positive cell segmentation label with another cell segmentation label determined by applying a watershed cell segmentation technique.

In some variations, the machine learning model may be a convolutional neural network.

In some variations, the segmenting of the image may include extracting, for each cell of the plurality of cells, one or more cellular features.

In some variations, the segmenting of the image may further include generating an expression matrix having rows corresponding to the plurality of rows and columns corresponding to the one or more cellular features. The phenotype for each cell of the plurality of cells may be determined based on the expression matrix.

In some variations, the segmenting of the image may further include enlarging a boundary of each cell of the plurality of cells identified within the image to include one or more cellular structures.

In some variations, the visual representation may include a first distribution of a gene expression profile of a first group of cells of the first cell type that exhibit a first co-occurrence pattern relative to a second group of cells of the second cell type.

In some variations, the visual representation may further include a second distribution of the gene expression profile of a third group of cells of the first cell type that exhibit a second co-occurrence pattern relative to the second group of cells of the second cell type.

In some variations, the gene expression profile may include an expression level of one or more specific genes.

In some variations, the first biological sample may include tissue fragments, free cells, and/or body fluids.

In some variations, the image may be a whole slide microscopy image.

In another aspect, there is provided a method for high dimensional spatial analysis. The method may include:

segmenting, into a plurality of segments, an image depicting a plurality of cells comprising a first biological sample, each segment of the plurality of segments corresponding to one cell of the plurality of cells; determining, based at least on the segmented image, a phenotype for each cell of the plurality of cells depicted in the image, the determining of the phenotype includes identifying, within the plurality of cells, a first cell type having a first phenotype and a second cell type having a second phenotype; determining a metric quantifying a co-occurrence pattern between the first cell type and the second cell type; and generating, based at least on the metric, a visual representation of the co-occurrence pattern between the first cell type and the second cell type.

In some variations, one or more features disclosed herein including the following features can optionally be included in any feasible combination. The phenotype for each cell of the plurality of cells may be determined by applying a dimensionality reduction technique including a principal component analysis (PCA), a uniform manifold approximation and projection (UMAP), and/or a T-distributed Stochastic Neighbor Embedding (t-SNE).

In some variations, the phenotype for each cell of the plurality of cells may be determined by applying a cluster analysis technique including a k-means clustering, a mean-shift clustering, a density-based spatial clustering of applications with noise (DBSCAN), an expectation-maximization (EM) clustering using Gaussian mixture models (GMM), and an agglomerative hierarchical clustering.

In some variations, the phenotype for each cell of the plurality of cells may be determined by based at least on a protein and/or a gene expressed by each cell of the plurality of cells.

In some variations, the metric may include a colocation quotient determined by applying a machine learning model trained to quantify a spatial distribution between the first cell type, the second cell type, and a third cell type having a third phenotype that is also present within the plurality of cells.

In some variations, the metric may include a colocation quotient is determined by at least determining a local density of cells of the first cell type that are spatially proximate to cells of the second cell type and a global density of cells of the first cell type that are spatially proximate to cells of the second cell type. The colocation quotient may correspond to a ratio of the local density relative to the global density.

In some variations, the metric may include an Earth Mover's Distance (EMD) quantifying a difference in a first spatial distribution of cells of the first cell type and a second spatial distribution of cells of the second cell type.

In some variations, the method may further include determining, based at least on the metric, a magnitude of an interaction between cells of the first cell type and cells of the second cell type.

In some variations, the interaction may include intercellular signaling by an endothelial growth factor (EGF) pathway, a vascular endothelial growth factor (VEGF) pathway, a growth arrest specific (GAS) pathway, a cadherin (CDH) pathway, and/or a cadherin 5 (CDH5) pathway.

In some variations, the method may further include identifying, based at least on a probability model, at least one signaling pathway for the interaction between the first cell type and the second cell type. The probability model may be determined based on a magnitude of interactions on different signaling pathways the first cell type and the second cell type observed in control samples having various spatial permutations of the first cell type and the second cell type.

In some variations, the metric may include a global value applicable to the plurality of cells depicted in the image.

In some variations, the metric may include a local value applicable to a subset of the plurality of cells depicted in the image.

In some variations, the subset of the plurality of cells may be determined based on a radius specified by one or more user inputs.

In some variations, the method may further include determining, for each of a plurality of reference samples, a reference metric. The plurality of reference samples may include a plurality of distributions of the first cell type and the second cell type. The reference metric may quantify the co-occurrence pattern between the first cell type and the second cell type present in each of the plurality of reference samples.

In some variations, the first cell type and the second cell type may be determined to exhibit a statistically significant attractive co-occurrence pattern based at least on the metric of the first biological sample exceeding the reference metric of more than a threshold quantity of the plurality of reference samples.

In some variations, the first cell type and the second cell type may be determined to exhibit a statistically significant avoidance co-occurrence pattern based at least on the metric of the first biological sample being less than the reference metric of more than a threshold quantity of the plurality of reference samples.

In some variations, the first cell type and the second cell type may be determined to exhibit a statistically insignificant co-occurrence pattern based at least on the metric of the first biological sample exceeding the reference metric or being less than the reference metric of less than a threshold quantity of the plurality of reference samples.

In some variations, the visual representation may include a heatmap including one or more visual indicators corresponding to a type and/or a magnitude of the co-occurrence pattern between the first cell type and the second cell type.

In some variations, the heatmap may include a first visual indicator corresponding to cells of the first cell type, a second visual indicator corresponding to cells of the second cell type that exhibit an attractive co-occurrence pattern relative to cells of the first cell type, and a third visual indicator corresponding to cells of the second cell type that exhibit an avoidance co-occurrence pattern relative to cells of the first cell type.

In some variations, the first visual indicator, the second visual indicator, and the third visual indicator may be associated with a different color, shape, and/or size.

In some variations, the second visual indicator may correspond to cells of the second cell type that exhibit an above-threshold attractive co-occurrence pattern relative to cells of the first cell type. The heatmap may further include a fourth visual indicator corresponding to cells of the second cell type that exhibit a below-threshold attractive co-occurrence pattern relative to cells of the first cell type.

In some variations, the third visual indicator may correspond to cells of the second cell type that exhibit an above-threshold avoidance co-occurrence pattern relative to cells of the first cell type. The heatmap may further include a fourth visual indicator corresponding to cells of the second cell type that exhibit a below-threshold avoidance co-occurrence pattern relative to cells of the first cell type.

In some variations, the first visual indicator, the second visual indicator, and the third visual indicator may be superimposed over the image depicting the plurality of cells.

In some variations, the visual representation may be generated by applying one or more dimensionality reduction techniques such that the visual representation includes a first cell cluster corresponding to the first cell type and a second cell cluster corresponding to the second cell type.

In some variations, the content of the visual representation may be determined based on one or more inputs selecting a portion of the image including a subset of the plurality of cells.

In some variations, the one or more inputs may select the portion of the image by at least specifying a zoom, a magnification level, and/or a field of view associated with the visual representation.

In some variations, the method may further include generating another visual representation of the co-occurrence pattern between the first cell type and the second cell type present in a second biological sample.

In some variations, the first biological sample may be a control sample and the second biological sample may be a treated sample.

In some variations, the first biological sample may be subjected to a first treatment and the second biological sample may be subjected to a second treatment.

In some variations, the method may further include pre-processing the image to convert the image from a first format to a second format, the first format being associated with an imaging system generating the image, and the second format being a non-proprietary, vendor independent format.

In some variations, the first format may be an imaging mass cytometry (IMC) format and the second format may be an Open Microscopy Environment Tag Image File Format COME TIFF) and/or a Tag Image File Format (TIFF).

In some variations, the preprocessing of the image may further include converting the image in the second format to a third format comprising a multichannel array.

In some variations, the preprocessing of the image may include at least one of a global background correction and a denoising.

In some variations, the image may be segmented by applying a machine learning model trained to perform per-cell segmentation by at least assigning, to each pixel in the image, a cell segmentation label indicating whether the pixel is a part of a background of the image or a part of a cell depicted in the image.

In some variations, the segmenting of the image may further include applying one or more rule-based functions to identify, based at least on morphology, a false positive cell segmentation label assigned to a pixel depicting a non-cellular structure.

In some variations, the segmenting of the image may further include replacing the false positive cell segmentation label with another cell segmentation label determined by applying a watershed cell segmentation technique.

In some variations, the machine learning model may be a convolutional neural network.

In some variations, the segmenting of the image may include extracting, for each cell of the plurality of cells, one or more cellular features.

In some variations, the segmenting of the image may further include generating an expression matrix having rows corresponding to the plurality of rows and columns corresponding to the one or more cellular features. The phenotype for each cell of the plurality of cells may be determined based on the expression matrix.

In some variations, the segmenting of the image may further include enlarging a boundary of each cell of the plurality of cells identified within the image to include one or more cellular structures.

In some variations, the visual representation may include a first distribution of a gene expression profile of a first group of cells of the first cell type that exhibit a first co-occurrence pattern relative to a second group of cells of the second cell type.

In some variations, the visual representation may further include a second distribution of the gene expression profile of a third group of cells of the first cell type that exhibit a second co-occurrence pattern relative to the second group of cells of the second cell type.

In some variations, the gene expression profile may include an expression level of one or more specific genes.

In some variations, the first biological sample may include tissue fragments, free cells, and/or body fluids.

In some variations, the image may be a whole slide microscopy image.

In another aspect, there is provided a computer program product including a non-transitory computer readable medium storing instructions. The instructions may cause operations may executed by at least one data processor. The operations may include: segmenting, into a plurality of segments, an image depicting a plurality of cells comprising a first biological sample, each segment of the plurality of segments corresponding to one cell of the plurality of cells; determining, based at least on the segmented image, a phenotype for each cell of the plurality of cells depicted in the image, the determining of the phenotype includes identifying, within the plurality of cells, a first cell type having a first phenotype and a second cell type having a second phenotype; determining a metric quantifying a co-occurrence pattern between the first cell type and the second cell type; and generating, based at least on the metric, a visual representation of the co-occurrence pattern between the first cell type and the second cell type.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to spatial analysis of high dimensional digital pathology image data and spatial transcriptomic data, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 8A depicts a flowchart illustrating an example of a process for spatial analysis, in accordance with some example embodiments;

FIG. 8B depicts a flowchart illustrating another example of a process for spatial analysis, in accordance with some example embodiment;

When practical, similar reference numbers denote similar structures, features, or elements.

DETAILED DESCRIPTION

Figure 1:
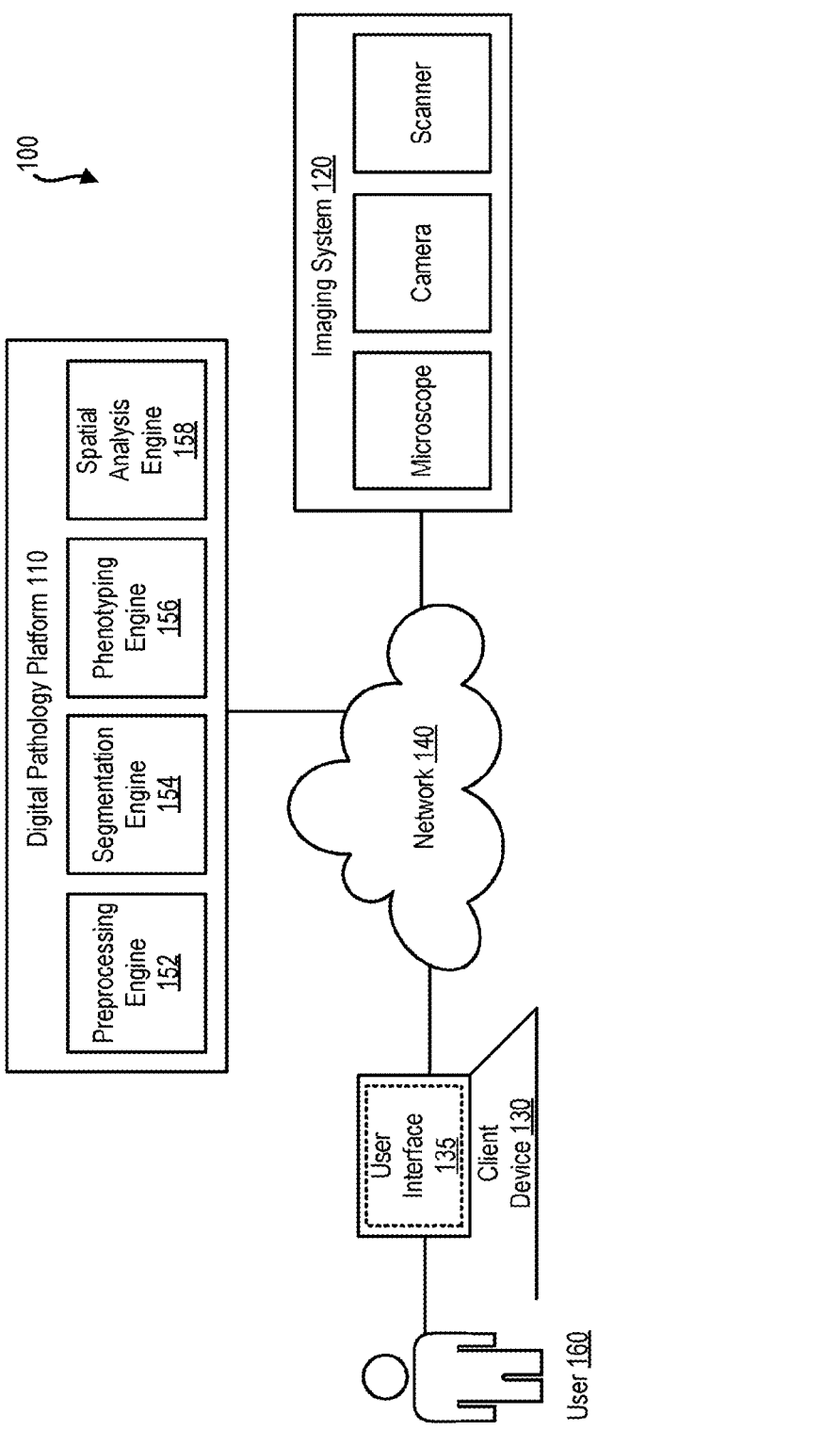
FIG. 1 depicts a system diagram illustrating an example of a digital pathology system, in accordance with some example embodiments.

Digital pathology images of biological samples, such as whole slide microscopy images, may provide cellular and sub-cellular-level insights into disease morphology, progression, and response. The biological samples can include, but are not limited to, blood, plasma, tissue, saliva, any sample from an individual that contains cells, and subcellular components (e.g., nuclei and cell membranes). In one non-limiting example, nuclear, membrane and/or cytoplasmic stain can be used to define cell boundaries. The centroid of this boundary can be used for spatial analysis whereas the signal inside the boundary can be used for phenotyping. In one example application, digital pathology images may capture cellular biomarkers for use in biomarker discovery as well as biomarker-based diagnostics. For example, digital pathology images of cancerous tissue may enable an interrogation of a tumor microenvironment (TME) including by providing a comprehensive view of the tumor microenvironment, the spatial structure of tissue components, and the microenvironment interaction between the tissue components. This information may be crucial towards understanding the various biological mechanisms present within the cancerous tissue including, for example, tissue formation, homeostasis, regeneration, immune response, and/or the like. For instance, spatial analysis of the cellular arrangement and architecture within the tumor microenvironment may reveal insights into an individual's (e.g. a patient's) immune response, disease recurrence, and tissue formation.

In some example embodiments, a digital pathology platform may support a digital pathology workflow by providing a variety of tools for processing and analyzing digital pathology images. For example, the digital pathology platform may include a preprocessing engine for converting the format of digital pathology images such as whole slide microscopy images (or other digitized microscope slide images), a segmentation engine for performing per cell segmentation, a phenotyping engine for determining the phenotype of each cell, and an analytics engine for performing various spatial analytics. As used herein, the term "microscopy image" may refer to any form of digitized microscope slide images including, for example, whole slide microscopy images and/or the like. The digital pathology platform may be hosted on cloud-based infrastructure such that the processing and analytical tools are accessible remotely, for example, as part of a web-based application, a native mobile application, a software-as-a-service (SaaS), and/or the like. Moreover, each of the processing and analytical tools may be implemented as interchangeable plugin modules. As such, one or more of the preprocessing engine, segmentation engine, phenotyping engine, and analytics engine may be replaced with alternatives that provide different functionalities. For example, a first segmentation engine applying a first segmentation technique (e.g., discontinuity detection based image segmentation) may be replaced with a second segmentation engine applying a second segmentation technique (e.g., machine learning based image segmentation).

Embodiments of the digital pathology platform described herein may further support a workflow that provides robust digital image processing and analysis tools capable of supporting high dimensional digital pathology image data as well as the high dimensional data derived therefrom. For example, a single color digital pathology image of a biological sample with an m×n quantity of pixels and three color channels (e.g., red, blue, and green) per pixel may be represented as an 3 mn-dimensional vector in which each of the m×n quantity of pixels is associated with three values corresponding to the intensity of each color channel. Some tasks within a digital pathology workflow, such as image segmentation to localize the individual cells depicted in the digital pathology image, may operate on the high dimensional digital pathology image data itself. Meanwhile, other tasks within the digital pathology workflow, such as phenotyping and spatial analysis, may operate on high dimensional data derived based on the digital pathology image.

Embodiments of the present digital pathology platform may further provide cellular phenotype analyses. Cellular phenotype, which corresponds to a cell's particular morphology and function, may be determined by the digital pathology platform based on a variety of cellular features such as the various proteins and/or genes expressed by the cell. As such, the digital pathology platform may perform phenotyping by performing operations on high dimensional data, such as a high dimensional vector enumerating the proteins and/or genes expressed by a cell, to identify populations of cells with different phenotypes that exist within the biological sample depicted in the digital pathology image. Further downstream, the digital pathology platform herein may compute spatial analytics to derive additional insights such as the co-occurrence of cells with different phenotypes. Spatial analysis may be performed to determine whether cells of a first phenotype and cells of a second phenotype co-occur with sufficient statistical significance. Furthermore, spatial analysis may be performed to determine a co-occurrence pattern for cells of the first phenotype and cells of the second phenotype. For instance, the cells of the first phenotype and the cells of the second phenotype may exhibit an attractive co-occurrence pattern in which the cells of the first phenotype and the cells of the second phenotype are likely to be located within close spatial proximity. Alternatively, the cells of the first phenotype and the cells of the second phenotype may exhibit an avoidance co-occurrence pattern in which case the cells of the first phenotype and the cells of the second phenotype are likely to be distantly located.

The digital pathology platform may provide an interactive user interface for interacting with one or more of the preprocessing engine, segmentation engine, phenotyping engine, and analytics engine. For example, the user interface may be a graphical user interface (GUI) displaying one or more visual representations of the results of preprocessing, segmenting, phenotyping, and/or analyzing a digital pathology image depicting one or more populations of cells. The one or more visual representations may include visual indicators denoting, for example, the interaction patterns or co-occurrence patterns associated with the different cellular phenotypes present in the digital pathology image. Being interactive, the contents of the visual representations may be updated in response to one or more user inputs. For instance, the digital pathology platform may respond to a selection made with respect to a first visual representation by updating the contents of the first visual representation as well as a second visual representation.

FIG. 1 depicts a system diagram illustrating an example of a digital pathology system 100, in accordance with some example embodiments. Referring to FIG. 1, the digital pathology system 100 may include a digital pathology platform 110, an imaging system 120, and a client device 130. As shown in FIG. 1, the digital pathology platform 110, the imaging system 120, and the client device 130 may be communicatively coupled via a network 140. The network 140 may be a wired network and/or a wireless network including, for example, a local area network (LAN), a virtual local area network (VLAN), a wide area network (WAN), a public land mobile network (PLMN), the Internet, and/or the like. The imaging system 120 may include one or more imaging devices including, for example, a microscope, a digital camera, a whole slide scanner, a robotic microscope, and/or the like. The client device 130 may be a processor-based device including, for example, a workstation, a desktop computer, a laptop computer, a smartphone, a tablet computer, a wearable apparatus, and/or the like.

Referring again to FIG. 1, the digital pathology platform 110 may include a preprocessing engine 152, a segmentation engine 154, a phenotyping engine 156, and a spatial analysis engine 158. In some example embodiments, the digital pathology platform 110 may support a digital pathology workflow, which may include preprocessing to convert the format of digital pathology images, cell segmentation to localize individual cells, phenotyping to determine a phenotype for each cell, and spatial metric to determine intercellular co-occurrence patterns. The digital pathology platform 110 may be hosted on cloud-based infrastructure such that the functionalities of the digital pathology platform 110 are accessible remotely, for example, as part of a web-based application, a native mobile application, a software-as-a-service (SaaS), and/or the like.

In some example embodiments, each of the preprocessing engine 152, the segmentation engine 154, the phenotyping engine 156, and the spatial analysis engine 158 may be implemented as interchangeable plugin modules. As such, one or more of the preprocessing engine 152, the segmentation engine 154, the phenotyping engine 156, and the spatial analysis engine 158 may be replaced with alternatives in order to provide different and/or additional functionalities. To further illustrate, FIGS. 9A-D depict screenshots of examples of user interfaces for configuring a digital pathology workflow with a selection of different techniques applied at each of the preprocessing engine 152, the segmentation engine 154, the phenotyping engine 156, and the spatial analysis engine 158.

Figure 9A:
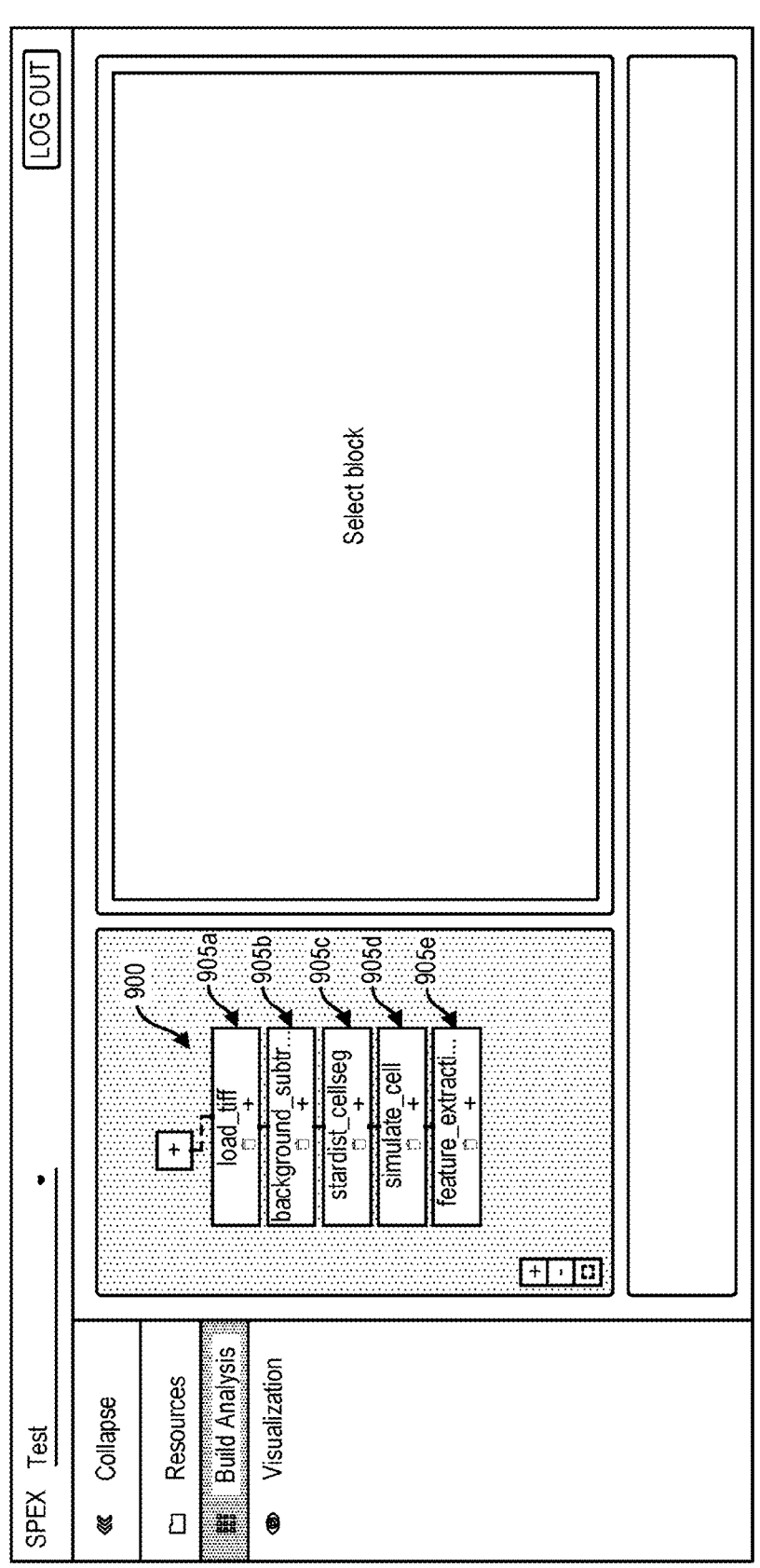
FIG. 9A depicts a screenshot illustrating an example of a user interface for configuring a digital pathology workflow, in accordance with some example embodiments.

FIG. 9A depicts a screenshot of an example of a user interface 135 in which a digital pathology workflow 900 is graphically represented as a sequence of blocks 905. Each block 905 included the digital pathology workflow 900 may correspond to one or more operations including, for example, the loading of digital pathology image data, preprocessing, segmentation, post processing, phenotyping, spatial analysis, and/or the like. For instance, the example of the digital pathology workflow 900 may include a first block 905a corresponding to the loading of digital pathology image data (e.g., in a Tag Image File Format (TIFF)), a second block 905b corresponding to the preprocessing of the digital pathology image data (e.g., background subtraction), a third block 905c corresponding to the per-cell segmentation of the digital pathology image data (e.g., star-convex polygon based per-cell segmentation), a fourth block 905d corresponding to the post processing of the digital pathology image data (e.g., boundary enlargement to simulate cells), and a fifth block 905e corresponding to the phenotyping of the digital pathology image data (e.g., extraction of single cell features indicative of the proteins and/or genes (e.g., ribonucleic acid (RNA) and/or the like) expressed by each cell).

In some example embodiments, the user 160 at the client device 130 may interact with the user interface 135 to configure the digital pathology workflow 900 by at least inserting, removing, and/or modifying one or more of the blocks 905. For example, the digital pathology workflow 900 may be configured to include a different sequence of operations than the example shown in FIG. 9A. That is, the digital pathology workflow 900 may be configured to include a different sequence of the blocks 905 in which one or more of the blocks 905 correspond to a different operation and/or are in a different order than shown. For instance, in cases where the digital pathology image data uploaded at the first block 905a is already preprocessed, the second block 905b corresponding to the preprocessing of the digital pathology image data may be omitted from the digital pathology workflow 900.

Figure 9B:
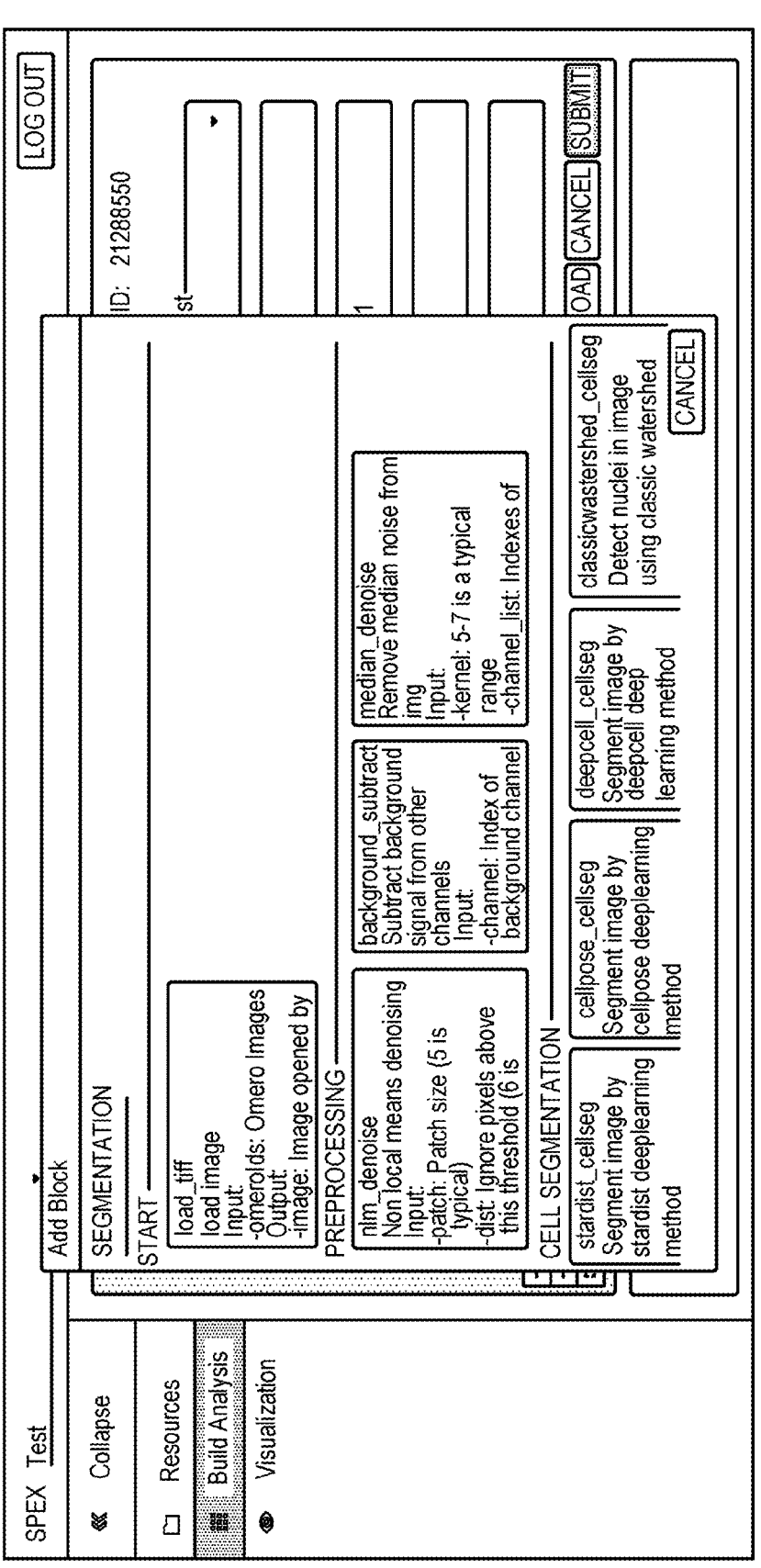
FIG. 9B depicts a screenshot illustrating another example of a user interface for configuring a digital pathology workflow, in accordance with some example embodiments.

FIG. 9B depicts a screenshot of another example of the user interface 135, in accordance with some example embodiments. The example of the user interface 135 shown in FIG. 9B supports interactions to insert and configure the one or more blocks 905 forming the digital pathology workflow 900. As shown in FIG. 9B, for each type of block, the user interface 135 may include a selection of different techniques that may be applied to the digital pathology image data. For example, for the first block 905a corresponding to the loading of the digital pathology image data, the user interface 135 may provide the option to load the digital pathology image data in one or more specific formats (e.g., Tag Image File Format (TIFF) and/or the like). For the second block 905b corresponding to the preprocessing of the digital pathology image data, the user interface 135 may provide the options to apply, for example, one or more of a non-local means denoising, a background subtraction, and a medium denoising to the digital pathology image data. For the third block 905c corresponding to the per-cell segmentation of the digital pathology image data, the user interface 135 may provide the options to apply, for example, one or more of a star-convex polygon based per-cell segmentation (e.g., stardist), morphology based per-cell segmentation (e.g., cellpose and deepcell), and nuclei-based cell segmentation (e.g., watershed cell segmentation).

Figure 9C:
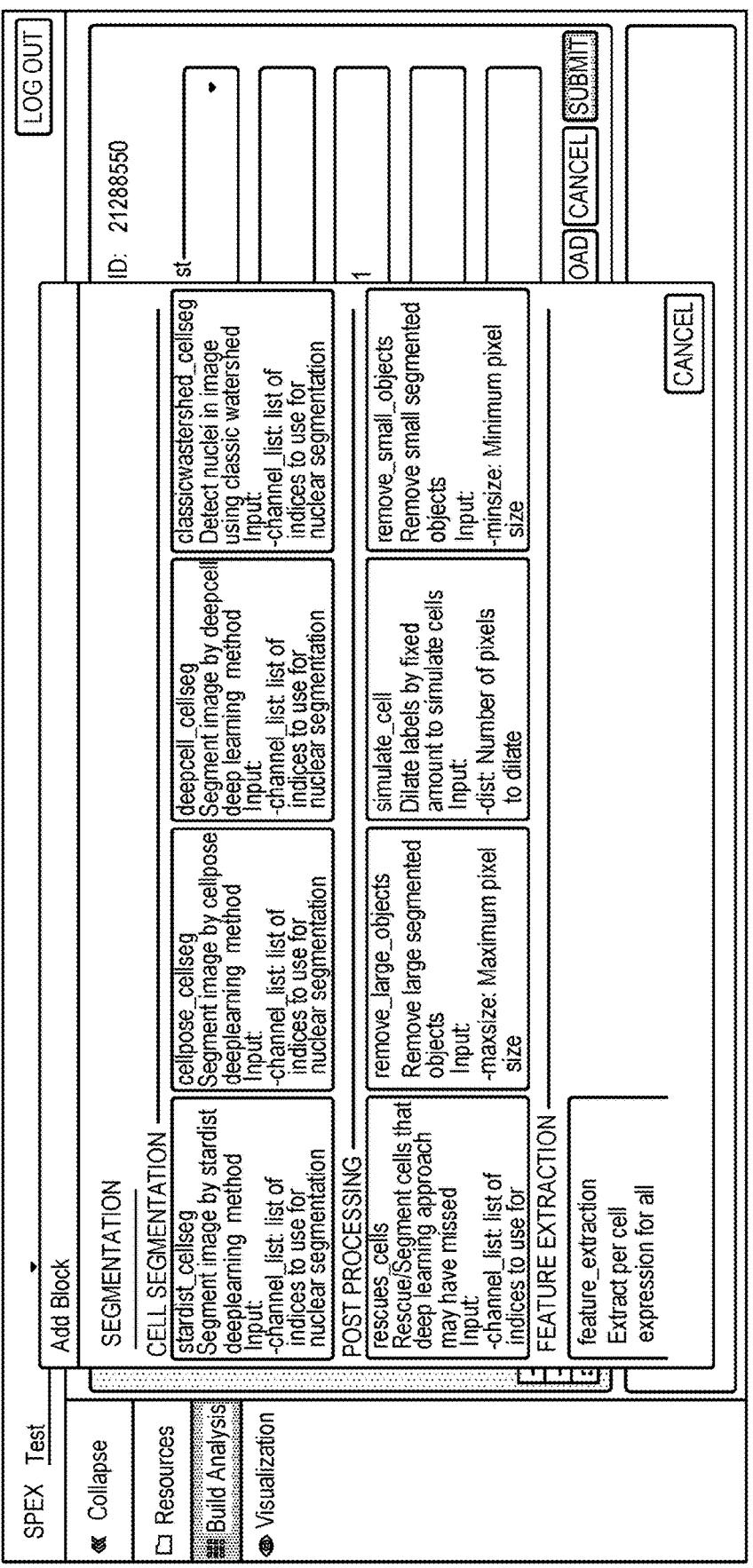
FIG. 9C depicts a screenshot illustrating another example of a user interface for configuring a digital pathology workflow, in accordance with some example embodiments.

FIG. 9C depicts a screenshot of another example of the user interface 135, in accordance with some example embodiments. The example of the user interface 135 shown in FIG. 9C supports further interactions to insert and configure the one or more blocks 905 forming the digital pathology workflow 900. As shown in FIG. 9C, the user interface 135 may provide various options for the post processing techniques associated with the third block 905c in the digital pathology workflow 900. The one or more post processing techniques selected via the user interface 135 may be applied to the digital pathology image data subsequent to the per-cell segmentation of the digital pathology image data. The example of the user interface 135 shown in FIG. 9C also provides the option to extract, from the digital pathology image data, one or more single cell features indicative of the proteins and/or genes (e.g., ribonucleic acid (RNA) and/or the like) expressed by each cell. As noted, such features may enable the subsequent phenotyping of each cell present in the digital pathology image data.

Referring again to FIG. 9C, one example of a post processing technique includes applying a non-deep learning based per-cell segmentation technique (e.g., watershed cell segmentation) to identify those missed by a previously applied deep learning based per-cell segmentation technique. Other examples of post processing techniques shown in FIG. 9C includes removing artifacts present in the digital pathology image data (e.g., large objects and/or small objects) and enlarging the boundaries individual cells to ensure that the segmented cells include various cellular structures such as cytoplasmic compartments.

Figure 9D:
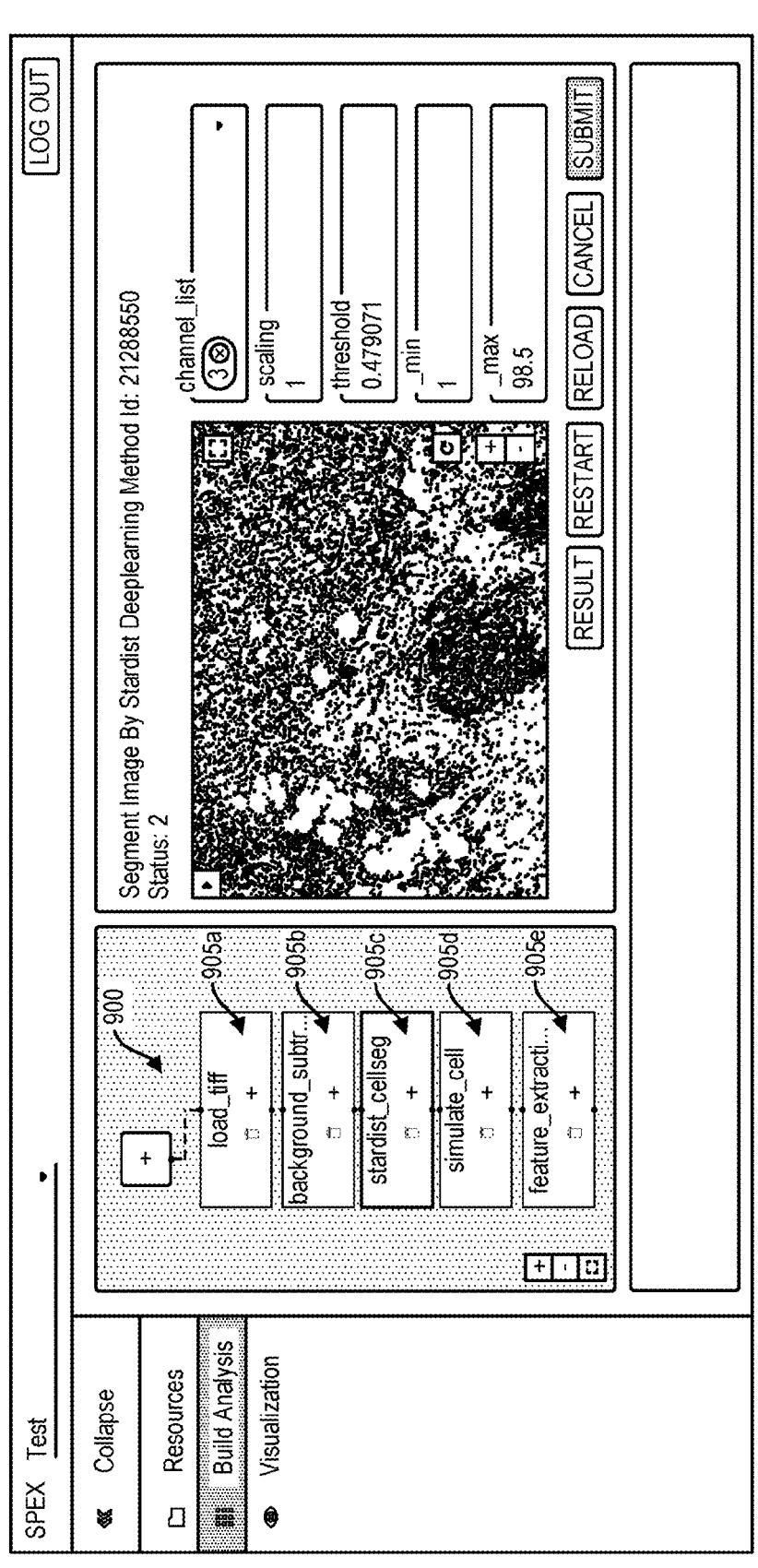
FIG. 9D depicts a screenshot illustrating another example of a user interface for configuring a digital pathology workflow, in accordance with some example embodiments.

FIG. 9D depicts a screenshot of another example of the user interface 135, in accordance with some example embodiments. According to some example embodiments, upon selecting a technique to implement an operation within the digital pathology workflow 900, the user interface 135 may be updated to receive additional inputs for configuring the technique. In the example shown in FIG. 9D, the user interface 135 may be configured to receive, from the user 160, one or more inputs for configuring the star-convex polygon based per-cell segmentation technique (e.g., stardist) selected for the third block 905c. As shown in FIG. 9D, the user interface 135 may include one or more input fields for parameters such as a detection channel list, a scaling factor, a prediction threshold, a minimum object size (e.g., in pixels), and a maximum object size (e.g., in pixels). It should be appreciated that the user interface 135 may support the configuration of each technique implementing each block 905 within the digital pathology workflow 900 such that each operation within the digital pathology workflow 900 may be performed in accordance with the parameters provided by the user 160.

In some example embodiments, upon configuring the digital pathology workflow 900, the digital pathology platform 110 may execute the digital pathology workflow 900 to load, preprocess, segment, post process, phenotype, and/or analyze the digital pathology image data. Referring again to FIG. 1, the digital pathology platform 110 may receive, for example, from the imaging system 120, digital pathology image data in a first format. The digital pathology image data may correspond to digitized microscope slide images including, for example, whole slide microscopy images and/or the like. To render the raw digital pathology image data more suitable for one or more downstream processing and analysis tasks, the preprocessing engine 152 may preprocess the digital pathology image data by at least converting the digital pathology image data from the first format to a second format. For example, the digital pathology image data from the imaging system 120 may correspond to highly multiplexed images in an imaging mass cytometry (IMC) format (e.g., .MCD files, .TXT files, and/or the like). The preprocessing engine 152 may convert the digital pathology image data from the imaging mass cytometry (IMC) format to a non-proprietary, vendor independent format. For example, the digital pathology image data may be converted to one or more Open Microscopy Environment Tag Image File Format (.OME.TIFF) files, which stores microscopy images captured at the imaging system 120 as raster graphics as well as the corresponding metadata (e.g., microscopic parameters describing the microscopy images and the acquisition optical conditions at the imaging system 120). Alternatively and/or additionally, the digital pathology image data may be converted into a Tag Image File Format (TIFF) for downstream processing and analysis. In some cases, the preprocessing engine 152 may further convert the digital pathology image data from the second format to a third format for subsequent processing. For instance, the digital pathology image data may be further converted from the Open Microscopy Environment Tag Image File Format (.OME. TIFF) to a multichannel array such as an in-memory multichannel NumPy array.

In some example embodiments, the preprocessing engine 152 may perform one or more optional preprocessing operations before the digital pathology image data undergoes per-cell segmentation in order to remove noise and improve pixel information in the digital pathology image data. Examples of optional preprocessing operations include global background correction and denoising. To perform global background correction, for example, the preprocessing engine 152 may subtract the background signal captured in one channel of the digital pathology image data from the other channels of the digital pathology image data. For example, signal in an autofluorescent or a detector noise channel may be subtracted from the signals in the channels housing specific molecular markers. Within the defined background channel, the preprocessing engine 152 may perform an image thresholding (e.g., Otsu's method and/or the like) to separate the digital pathology image data in the background channel into two separate classes of pixels, with the pixels in one class forming a positive pixel binary mask that can be intensity-scaled before being subtracted from the signals of the other channels.

In some example embodiments, the preprocessing engine 152 may employ a variety of techniques to denoise the digital pathology image data including, for example, median filter denoising, non-local means (NLM) denoising, and/or the like. With median filter denoising, for example, the preprocessing engine 152 may apply a filter that replaces a pixel's value with the median value of the pixels within a local neighborhood whose size may be defined by the kernel size of the filter. In the case of non-local means (NLM) denoising, the preprocessing engine 152 may replace the value of a pixel in a first region with a mean value determined by sampling at least a second region in the digital pathology image data that is similar to the first region. While medium denoising can preserve edge information while suppressing noise, non-local means (NLM) denoising may preserve local texture information.

Figure 2:
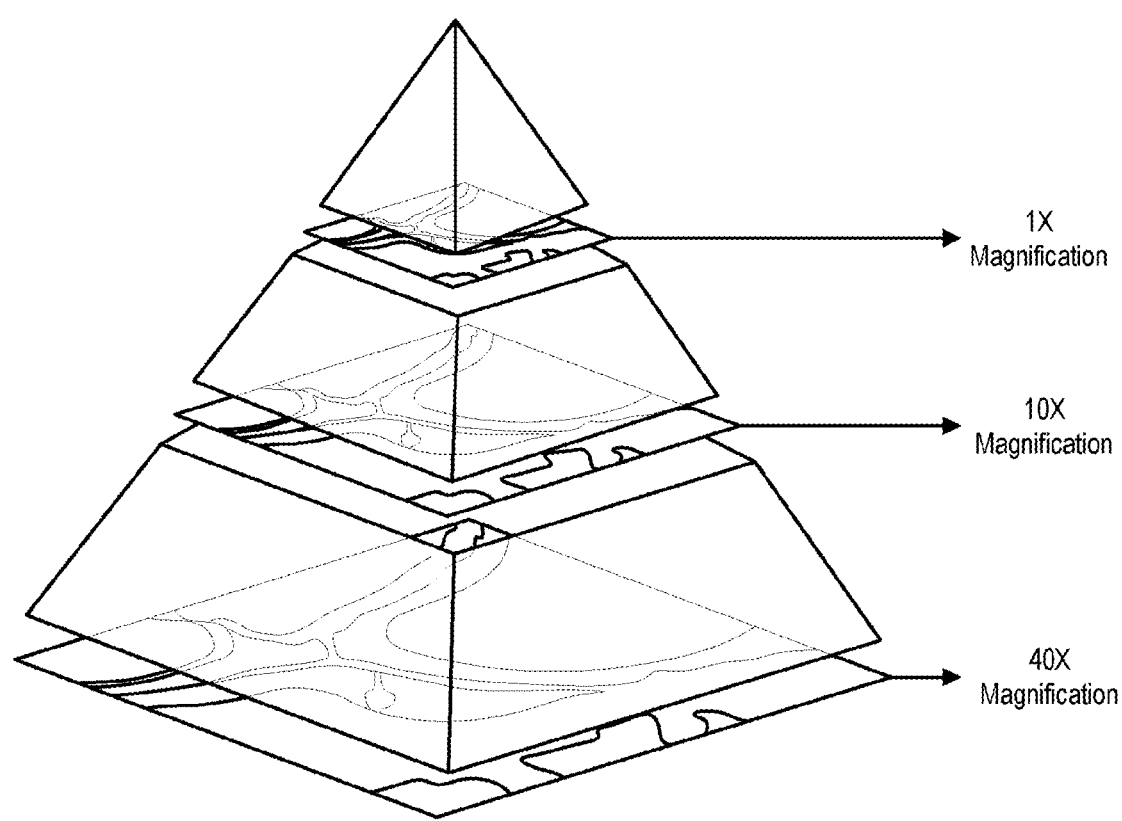
FIG. 2 depicts an example of a whole slide microscopy image at different levels of magnification, in accordance with some example embodiments.

In some example embodiments, the segmentation engine 154 may perform per-cell segmentation in order to localize the individual cells that are present in a microscopy image depicting a biological sample such as tissue fragments, free cells, body fluids, and/or the like. For example, the segmentation engine 154 may perform per-cell segmentation to assign, to each pixel within the digital pathology image data, a cell segmentation label identifying the cell to which the pixel belongs. The segmentation engine 154 may operate on digital pathology image data that have been preprocessed by the preprocessing engine 152. Moreover, the task of per-cell segmentation may include operating on high-dimensional digital pathology image data, particularly when the microscopy images are high resolution and/or obtained at a high level of magnification. To further illustrate, FIG. 2 depicts an example of a whole slide microscopy image 200 at different levels of magnification (e.g., 1× magnification, 10× magnification, and 40× magnification). At higher levels of magnification, the whole slide microscopy image may include more pixels, each of which corresponding to a dimension.

In some example embodiments, the segmentation engine 154 may apply a variety of cell segmentation techniques including, for example, watershed cell segmentation, deep learning based cell segmentation, and/or the like. For example, the segmentation engine 154 may train and apply a machine learning model (e.g., a convolutional neural network and/or the like) to perform per-cell segmentation. The machine learning model may perform per-cell segmentation by at least performing cell detection based on star-convex polygons. That is, the machine learning model may perform per-cell segmentation by at least determining, for each pixel in the microscopy image, whether the pixel is a part of the background of the microscopy image or a part of a cell depicted in the microscopy image. To do so, the machine learning model may assign, to each pixel in the microscopy image, a star-convex polygon corresponding to the boundary of the cell to which the pixel belongs. The machine learning model may further predict, for each pixel in the microscopy image, a probability of the pixel being a part of a cell depicted in the microscopy image.

Accordingly, for each pixel with index i, j, the machine learning model may assign a corresponding star-convex polygon by regressing the distances $$\{r_{i,j}^k\}_{k=1}^n$$

to the boundary of the cell to which the pixel belongs, along a set of n predefined radial directions with equidistant angles. The star-convex polygon assigned to a pixel may be considered a candidate cell if the pixel is determined to be part of a cell with a sufficiently high probability $d_{i,j}$. The probability that the pixel is part of a cell depicted in the microscopy image and not part of the background of the microscopy image may correspond to the distance between the pixel and the nearest background pixel. The individual cells that are present in the microscopy image may be localized by performing a non-maximum suppression (NMS) on the candidate cells and the corresponding probabilities. It should be appreciated that the deep learning based cell segmentation technique may use information associated with nuclear, membrane and/or cytoplasmic stain to define cellular boundaries. The centroid of this boundary may be used for spatial analysis whereas the signal inside the boundary is used for phenotyping. Moreover, instead of and/or in addition to cell segmentation, the segmentation engine 154 may apply segmentation techniques to digital pathology image data to identify tissues, fluid areas, imaging artifacts, imaging errors, or any other detectable features from the image data.

The digital pathology image data may include technical artifacts, such as tissue tears, folds, and/or debris, that may give rise to false positive cell segmentation labels. As such, in some cases, upon performing per-cell segmentation to localize the individual cells that are present in the microscopy image, the segmented microscopy image may undergo one or more post processing operations to correct at least some of the false positive cell segmentation labels assigned during the segmentation of the microscopy image. For example, the segmentation engine 154 may apply one or more rule-based functions to identify, based at least on morphology, one or more false positive cell segmentation labels assigned to pixels depicting non-cellular structures such as tissue tears, folds, debris, and/or the like. These false positive cell segmentation labels may be excluded or, as described in more detail below, replaced with labels determined using one or more alternate cell segmentation techniques. In cases where the segmentation engine 154 applies a cell segmentation technique that localizes individual cells based on the nucleus of each cell, the post processing of the segmented microscopy image may also include enlarging the boundaries of the individual cells to ensure that the segmented cells include various cellular structures such as cytoplasmic compartments.

The segmentation engine 154 may, upon localizing the individual cells present in the microscopy image, extract one or more single cell features for subsequent phenotyping by the phenotyping engine 156. For example, the segmentation engine 154 may extract single cell features that are indicative of the proteins and/or genes (e.g., ribonucleic acid (RNA) and/or the like) expressed by each cell. In some example embodiments, these single cell features may include, for each cell present in the biological sample, a mean intensity for each channel of the digital pathology image data. Other examples of single cell features may include the cell size, cell shape, nucleus texture, cytoplasm texture, and/or the like. In some example embodiments, the segmentation engine 154 may generate, as input for downstream phenotyping by the phenotyping engine 156, an expression matrix populated by the features of each cell present in the biological sample. For instance, in some cases, the rows of the expression matrix may correspond to the individual cells present in the biological sample whereas the columns of the expression matrix may correspond to the different features exhibited by each cell.

In some example embodiments, the segmentation engine 154 may apply multiple cell segmentation techniques to perform per-cell segmentation and localize the individual cells that are present in the microscopy image. In some cases, the segmentation label for a single pixel may be determined based on a first result of a first cell segmentation technique and a second result of a second cell segmentation technique. For example, the segmentation engine 154 may apply, to a pixel within the microscopy image, a first machine learning model to determine a first cell segmentation label and a second machine learning model to determine a second cell segmentation label. Moreover, the segmentation engine 154 may determine, based at least on the first cell segmentation label and the second segmentation label, a third cell segmentation label for the pixel. Alternatively and/or additionally, where a first cell segmentation technique assigns a false positive segmentation label to a pixel, the segmentation engine 154 may apply a second cell segmentation technique to determine a cell segmentation label to the pixel. In this case, the resulting segmented microscopy image may include cell segmentation labels determined by applying the first cell segmentation technique as well as cell segmentation labels determined by applying the second cell segmentation technique. For instance, in the event a machine learning model assigns a false positive cell segmentation label to a pixel, the segmentation engine 154 may apply a watershed cell segmentation technique to determine a cell segmentation label for the pixel.

Referring again to FIG. 1, the phenotyping engine 156 may determine, for each cell depicted in a microscopy image, a corresponding phenotype. For example, the phenotyping engine 156 may identify, within the population of cells depicted in the microscopy image, a first subpopulation of cells having a first phenotype A and a second subpopulation of cells having a second phenotype B. The phenotype of a cell may be determined based on cellular features such as the proteins and genes (e.g., ribonucleic acid (RNA) and/or the like) expressed by the cell. Gene expression and protein production are cellular processes that determine the morphology and function of different cells. Thus, the first subpopulation of cells having the first phenotype A and the second subpopulation of cells having the second phenotype B may exhibit one or more differences in morphology and function.

In some example embodiments, the phenotyping engine 156 may apply a variety of techniques to determine a phenotype for each cell present in the microscopy image. As noted, the task of phenotyping may include operations on high dimensional phenotype data, such as high dimensional vectors enumerating the various proteins and/or genes expressed by each cell depicted in the microscopy image, and cell morphology features. For example, some datasets may characterize individual cells with more than 300 features corresponding to the proteins and genes expressed by each cell. Accordingly, the phenotyping engine 156 may apply one or more machine learning based techniques to identify subpopulations of cells having different phenotypes through dimensionality reduction in which the high dimensional vectors forming the phenotype data are embedded (or projected) in a lower dimensional space. Examples of such machine learning based techniques include principal component analysis (PCA), uniform manifold approximation and projection (UMAP), and T-distributed Stochastic Neighbor Embedding (t-SNE). Alternatively and/or additionally, subpopulations of cells with different phenotypes may be identified through cluster analysis, which includes grouping the cells present in the microscopy image based on the proteins and/or genes expressed by each cells. Examples of cluster analysis techniques include k-means clustering, mean-shift clustering, density-based spatial clustering of applications with noise (DBSCAN), expectation-maximization (EM) clustering using Gaussian mixture models (GMM), and agglomerative hierarchical clustering.

Due to the high dimensionality of some phenotype datasets, it should be appreciated that the phenotyping engine 156 may, in some instances, apply a dimensionality reduction technique prior to performing a cluster analysis. The need to reduce the dimensionality of phenotype data may arise because the relationships between cells having a same phenotype may be obscured by the high dimensionality of the corresponding data. For example, the high dimensionality of phenotype data may obscure the similarities between two cells expressing a same or similar set of proteins and/or genes. Moreover, the high dimensionality of phenotype data may thwart efforts to analyze and visualize the data. For instance, the high dimensionality of the phenotype data may cause overfitting, in which the analysis is skewed by the noise present in the dataset. High dimensional phenotype data may also be unsuitable for rendering in a graphic user interface (GUI) at least because high dimensional data tends to be impractical for human consumption.

In some example embodiments, the spatial analysis engine 158 may perform spatial analytics to determine cell-to-cell interactions, for instance, whether cells of different phenotypes co-occur with sufficient statistical significance within the biological sample depicted in a microscopy image. When two or more cells of different phenotypes co-occur with sufficient statistical significance, a spatial relationship may be present between the two or more cells of different phenotypes. This spatial relationship may exhibit a pattern such as an attractive co-occurrence pattern or an avoidance co-occurrence pattern. An attractive co-occurrence pattern may be present between cells of a first phenotype and cells of a second phenotype if cells of the first phenotype are proximate to cells of the second phenotype in the biological sample. That is, cells of the first phenotype may be located within a threshold distance of cells of the second phenotype in the biological sample, which may signify the presence of various biological relationships between cells of the first phenotype and cells of the second phenotype including, for example, the recruitment of cells of the second phenotype in response to biological outputs from the cells of the first phenotype (e.g., cytokines, chemokines), functional codependency, intercellular signaling, and/or the like.

Contrastingly, an avoidance co-occurrence pattern may be present between cells of the first phenotype and cells of the second phenotype if cells of the first phenotype are not located within the threshold distance of the cells of the second phenotype. An avoidance co-occurrence pattern may signify a lack of biological relationships between cells of the first phenotype and cells of the second phenotype. For example, an above threshold distance between cells of the first phenotype and cells of the second phenotype may indicate a negative feedback loop, removal (e.g., apoptosis) and/or downregulation of cells of a second phenotype when the cells of the first phenotype are present, lack of functional codependency, intercellular signaling, and/or the like. The spatial relationship between the cells of the first phenotype and the cells of the second phenotype may thus provide various cellular and sub-cellular-level insights into disease morphology, progression, and response. Accordingly, spatial analysis may be performed to determine a co-occurrence pattern for cells of different phenotypes. For example, the spatial analysis engine 158 may determine whether cells of a first phenotype A and cells of a second phenotype B exhibit an attractive co-occurrence pattern or an avoidance co-occurrence pattern. In addition or instead of spatial analysis, it should be appreciated that the spatial analysis engine 158 may perform other types of digital pathology analysis including, for example, whole slide imaging, tile-based scanning, line-based scanning, telepathology, and/or the like.

The spatial analysis engine 158 may determine a global co-occurrence pattern applicable to an entire population of cells present in a biological sample depicted in the microscopy image. Alternatively and/or additionally, the spatial analysis engine 158 may determine a local co-occurrence pattern that is applicable to a subpopulation of cells present in a portion of the biological sample depicted in the microscopy image. It should be appreciated that the global co-occurrence pattern that is present in an entire population of cells may be different than the local co-occurrence patterns that are present within subpopulations of cells. That is, the biological sample may exhibit local heterogeneity in which the cells occupying one or more portions of the biological sample exhibit a different local co-occurrence pattern than the global co-occurrence pattern for the entire biological sample. For example, while cells of the first phenotype A may exhibit an attractive global co-occurrence pattern relative to cells of the second phenotype B, the two cellular phenotypes may exhibit an avoidance local co-occurrence in some portions of the biological sample.

Moreover, in some example embodiments, the digital pathology platform 110 may determine a local co-occurrence pattern in response to receiving, from the client device 130, one or more user inputs selecting at least a portion of the biological sample depicted in the microscopy image. The one or more user inputs may identify a subpopulation of cells by specifying, for example, a portion of the microscopy image defined by a field of view (FOV). Accordingly, instead of or in addition to determining the global co-occurrence pattern for the entire biological sample, the digital pathology platform 110 may determine the local co-occurrence pattern that is present within a subpopulation of cells occupying the selected portion of the microscopy image.

In some example embodiments, the spatial analysis engine 158 may determine, for one or more pairs of cellular phenotypes present in a biological sample depicted in a microscopy image, one or more metrics indicative of a co-occurrence pattern between each pair of cellular phenotypes. For example, the spatial analysis engine 158 may determine a colocation quotient (CLQ) indicative of a co-occurrence pattern between cells of a first phenotype A and cells of a second phenotype B. The colocation quotient may correspond to a ratio of a local density of cells of the first phenotype A that are spatially proximate cells of the second phenotype B relative to a global density of cells of the first phenotype A that are spatially proximate cells of the second phenotype B.

The spatial analysis engine 158 may determine, based at least on the colocation quotient of the biological sample being below reference colocation quotient of more than a threshold quantity reference samples (e.g., having various permutations of cells of the first phenotype A and cells of the second phenotype B), that cells of the first phenotype A and cells of the second phenotype B exhibit a statistically significant attractive co-occurrence pattern. Contrastingly, when colocation quotient of the biological sample does not exceed the reference colocation quotient of more than the threshold quantity of reference samples, the spatial analysis engine 158 may determine that cells of the first phenotype A and cells of the second phenotype B exhibit a statistically significant avoidance co-occurrence pattern. Where the colocation quotient of the biological sample exceeds the reference colocation quotient or is less than the reference colocation quotient of less than the threshold quantity of reference samples, the spatial analysis engine 158 may determine that cells of the first phenotype A and cells of the second phenotype B exhibit a statistically insignificant co-occurrence pattern.

Figure 3:
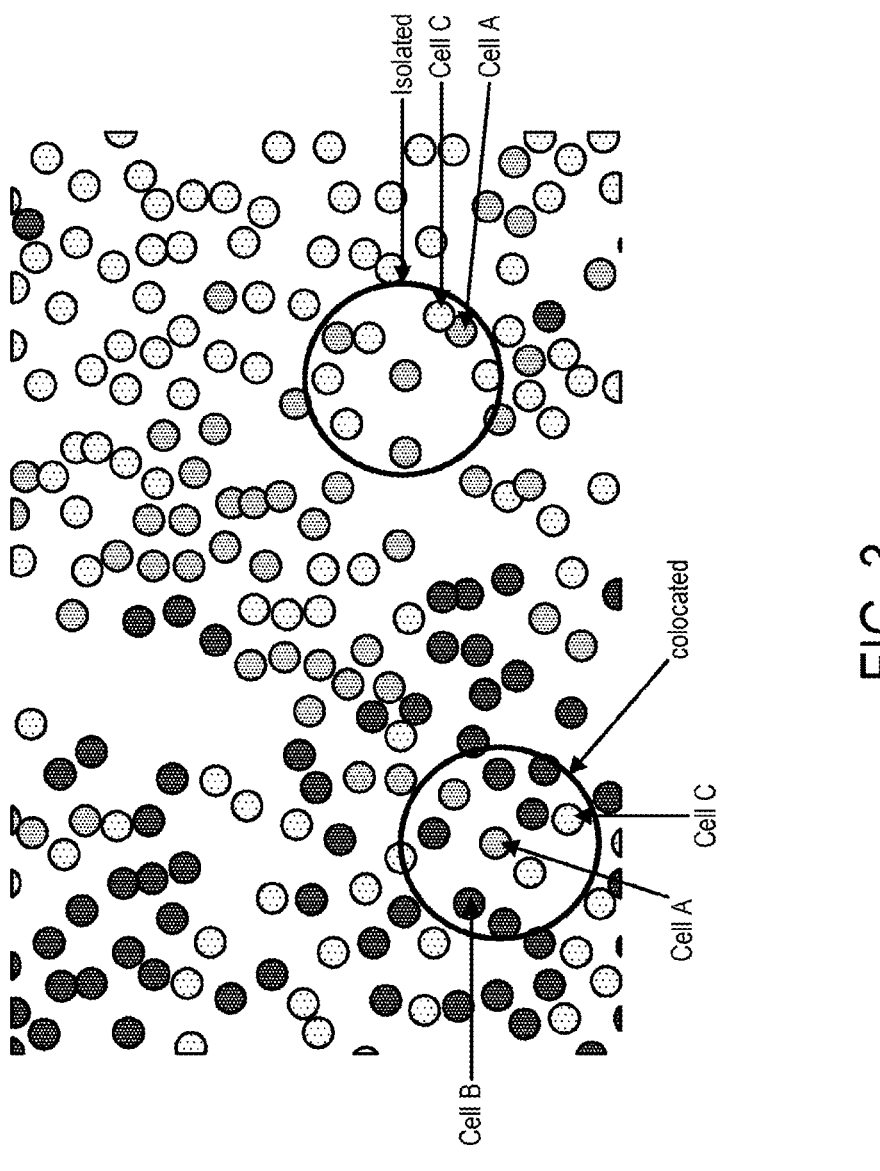
FIG. 3 depicts an example of a microscopy image depicting a population of cells of various phenotypes, in accordance with some example embodiments.

The spatial analysis engine 158 may determine a colocation quotient (CLQ) between two populations of cells, such as cells of the first phenotype A and cells of the second phenotype B, in a variety of ways. It should be appreciated that cells of the first phenotype A and cells of the second phenotype B may be part of a biological sample that includes additional cellular phenotypes such as cells of a third phenotype C. This phenomenon is illustrated in FIG. 3, which depicts the spatial distribution of various cellular phenotypes (e.g., the first phenotype A, the second phenotype B, and the third phenotype C) present in a population of cells depicted in a portion of a microscopy image. In some cases, as is the case shown in FIG. 3, the third phenotype C may refer to multiple other cellular phenotypes collectively (e.g., all other cells not of the first phenotype A or the second phenotype B). The colocation quotient between cells of the first phenotype A and cells of the second phenotype B may retain spatial information associated with the other cellular phenotypes present in the biological sample, such as cells of the third phenotype C. For example, as shown in FIG. 3, cells of the first phenotype A may be the nearest neighbors of cells of the second phenotype B but cells of the second phenotype B may be the nearest neighbors of cells of the third phenotype C not the nearest neighbors of cells of the first phenotype A. The colocation quotient may be computed to account for this asymmetry in spatial correlation. Otherwise, spatial analysis may become confounded by spatial autocorrelation between the joint populations of cells such as the cells of the first phenotype A, cells of the second phenotype B, and cells of the third phenotype C.

In some example embodiments, the spatial analysis engine 158 may determine, based at least on the colocation quotient (CLQ) between cells of the first phenotype A and cells of the second phenotype B, a magnitude of interactions between cells of the first phenotype A and cells of the second phenotype B. Examples of cellular interactions may include intercellular signaling, which may take place over a variety of signaling pathways including, for example, endothelial growth factor (EGF), vascular endothelial growth factor (VEGF), growth arrest specific (GAS), cadherin (CDH), cadherin 5 (CDH5), and/or the like.

In some cases, the magnitude of interactions between cells of the first phenotype A and cells of the second phenotype B may correspond at least partially to the colocation quotient (CLQ) between cells of the first phenotype A and cells of the second phenotype B. For example, in cases where the colocation quotient (CLQ) indicates an avoidant co-occurrence pattern between cells of the first phenotype A and cells of the second phenotype B, the magnitude of interactions between the two cellular phenotypes may be correspondingly low. Contrastingly, where the colocation (CLQ) indicates an attractive co-occurrence pattern between cells of the first phenotype A and cells of the second phenotype B, the magnitude of interactions between the two cellular phenotypes may be higher. In some cases, the spatial analysis engine 158 may also identify the types of interactions, such as the signaling pathways, between cells of the first phenotype A and cells of the second phenotype B based on one or more probability models of previously observed interactions between the two cellular phenotypes. For instance, one example of a probability model may be determined based on the magnitude of interactions on different signaling pathways between cells of the first phenotype A and cells of the second phenotype B observed in various control samples having different spatial permutations of the two cellular phenotype.

To further illustrate, FIG. 8B depicts a flowchart illustrating an example of a process 830 for identifying a magnitude of an interaction between cells of different cellular phenotypes such as, for example, cells of the first phenotype A and cells of the second phenotype B. Referring to FIGS. 1 and 8B, the process 830 may be performed by the digital pathology platform 110, for example, by the spatial analysis engine 158.

At 832, the digital pathology platform 110 may determine, based at least on a metric quantifying a co-occurrence pattern between a first cell type and a second cell type, a magnitude of an interaction between cells of the first cell type and cells of the second cell type. For example, in some example embodiments, the digital pathology platform 110 may determine, based at least on a colocation quotient (CLQ) between cells of the first phenotype A and cells of the second phenotype B, a magnitude of interactions between cells of the first phenotype A and cells of the second phenotype B. As noted, the colocation quotient (CLQ), which quantities the co-occurrence pattern between cells of the first phenotype A and cells of the second phenotype B, may indicate a presence (or absence) of various biological relationships between cells of the first phenotype A and cells of the second phenotype B. These biological relationships may include, for example, the recruitment of cells of the second phenotype in response to biological outputs from the cells of the first phenotype A (e.g., cytokines, chemokines), functional codependency, intercellular signaling, and/or the like.

At 834, the digital pathology platform 110 may determine a probability model of interactions on different signaling pathways between the first cell type and the second cell type. For example, in some cases, the digital pathology platform 110 may also identify the types of interactions, such as the signaling pathways, between cells of the first phenotype A and cells of the second phenotype B based on one or more probability models of previously observed interactions between the two cellular phenotypes. One example of a probability model may be determined based on the magnitude of interactions on different signaling pathways between cells of the first phenotype A and cells of the second phenotype B observed in various control samples having different spatial permutations of the two cellular phenotype.

At 836, the digital pathology platform 110 may determine, based at least on the probability model, at least one signaling pathway for the interaction between cells of the first cell type and cells of the second cell type. For example, in some example embodiments, the digital pathology platform 110 may determine, based at least on the probability model, at least one signaling pathway for the interactions between cells of the first phenotype A and cells of the second phenotype B. Examples of different signaling pathways that may exist between cells of the first phenotype A and cells of the second phenotype B include an endothelial growth factor (EGF) pathway, a vascular endothelial growth factor (VEGF) pathway, a growth arrest specific (GAS) pathway, a cadherin (CDH) pathway, a cadherin 5 (CDH5) pathway, and/or the like.

Alternatively and/or additionally, the colocation quotient between cells of a first phenotype A and cells of a second phenotype B may be determined based on the relative spatial relationship between cells of the first phenotype A and cells of the second phenotype B. The relative spatial relationship between cells of the first phenotype A and cells of the second phenotype B may include, for example, the quantities of cells of the first phenotype A and cells of the second phenotype B that are present within the biological sample, the distance between cells of the first phenotype A and cells of the second phenotype B within the biological sample, and/or the like. For example, the spatial analysis engine 158 may analyze the neighborhood within a radius r (e.g., x microns) of each cell of the first phenotype A to determine the presence of cells of the second phenotype B. Accordingly, for the $i^{th}$ cell of the first phenotype A, the spatial analysis engine 158 may determine, in accordance with Equation (1) below, a local colocation quotient LCLQ corresponding to a quantity and proximity of cells of the second phenotype B within the neighborhood of radius r.

$$LCLQ_{A_i \to B} = \frac{N_{A_i \to B}}{N_B/(N-1)} \tag{1}$$

wherein $$N_{A_i \to B} = \sum_{j=1(j \neq i)}^{N} \left( \frac{w_{ij} f_{ij}}{\sum_{j=1(j \neq i)}^{N} w_{ij}} \right)$$

in which $f_{ij}$ may be a binary variable indicating whether the $j^{th}$ point corresponds to a cell of the second phenotype B, and $w_{ij}$ may denote the distance decay kernel.

In a non-weighted version of the calculations, which may be more suited for smaller values of the radius r, the distance decay kernel $w_{ij}$ may be $$\frac{1}{N}.$$

Alternatively, in the weighted version, which may be more suitable for larger values of the radius r, the distance decay kernel $w_{ij}$ may be a Gaussian kernel $$\left(e.g., w_{ij} = \exp\left(-0.5 \times \left(\frac{d_{ij}^2}{d_{ib}^2}\right)\right)\right),$$

a bisquare Kernel $$\left(e.g., w_{ij} = 1 - \left(\frac{d_{ij}^2}{d_{ib}^2}\right)\right),$$

and/or the like. Once the spatial analysis engine 158 has determined a local colocation quotient LCLQ for each cell of the first phenotype A relative to cells of the second phenotype B, the spatial analysis engine 158 may loop through each cell of the first phenotype A to determine a global colocation quotient CLQ in accordance with Equation (2) below. The threshold colocation quotient value (e.g., a minimum CLQ) for determining whether the cells of the first phenotype A and cells of the second phenotype B co-occur with sufficient statistical significance may be determined by applying a random labeling (or permutation) technique.

$$CLQ_{A \to B} = \frac{N_{A \to B}/N_A}{N_B/(N-1)} \tag{2}$$

The random labeling (or permutation) technique may include determining a reference colocation quotient for each of an x quantity of reference samples (e.g., 1000 samples and/or the like) having various distribution of cells of the first phenotype A and cells of the second phenotype B. Cells of the first phenotype A and cells of the second phenotype B may be determined to exhibit a statistically significant attractive co-occurrence pattern if the colocation quotient for the biological sample exceeds the reference colocation quotient of more than a threshold quantity of the reference samples. Contrastingly, cells of the first phenotype A and cells of the second phenotype B may be determined to exhibit a statistically significant avoidance co-occurrence pattern if the colocation quotient for the biological sample does not exceed the reference colocation quotient of more than the threshold quantity of the reference samples.

In yet another example, the co-occurrence pattern between cells of the first phenotype A and cells of the second phenotype B may be determined based at least on an Earth Mover's Distance (EMD) quantifying a difference in a spatial distribution between cells of the first phenotype A and cells of the second phenotype B. In this context, the Earth Mover's Distance between a first population of cells having the first phenotype A and a second population of cells having the second phenotype B may correspond to a "cost" associated with transforming the second population of cells having the second phenotype B such that the spatial distribution of the second population of cells conforms to the spatial distribution exhibited by the first population of cells having the first phenotype A. This cost may quantify the changes made to transform the spatial distribution of the second population of cells having the second phenotype B to conform to the spatial distribution of the first population of cells having the first phenotype A. Accordingly, the cost may include the quantity of cells of the second phenotype B that are moved in order to transform the spatial distribution of the second population of cells to the spatial distribution of the first population of cells having the first phenotype A. Moreover, the cost may include the distance that the cells of the second phenotype B is moved to transform the spatial distribution of the second population of cells. Thus, the cost associated with transforming the second population of cells having the second phenotype B may measure how different cells of the second phenotype B are spatially distributed within the biological sample than cells of the first phenotype A. Two populations of cells having a larger quantity of more proximately located cells may therefore be associated with a lower cost corresponding to a lower Earth Mover's Distance whereas two populations of cells having a larger quantity of more distantly located cells may be associated with a higher cost corresponding to a higher Earth Mover's Distance.

To further illustrate, assume two distributions of cells represented by the signatures A={(a_1, wa_1), ..., (a_m, wa_m)} and B={(b_1, wb_1), ..., (b_m, wb_n)}, wherein $a_i$ and $b_i$ denote bin centroids with respective frequencies $wa_i$ and $wb_i$, and D=[$d_{ij}$] is a matrix of Euclidean distances between bin centroids $a_i$ and $b_j$ for all values of i and j. The cost of the transforming the first distribution A to conform to the second distribution B may be computed based on Equation (3) below.

$$\text{Cost}(A, B, F) = \sum_{i=1}^{m} \sum_{j=1}^{n} d_{ij} f_{ij} \tag{3}$$

The Earth Mover's Distance EMD between the first distribution A and the second distribution B may correspond to an optimal flow F=[$f_{ij}$] between the bin centroids $a_i$ and $b_j$ that minimizes the cost function set forth in Equation (3). As shown in Equation (4) below, the Earth Mover's Distance EMD between the first distribution A and the second distribution B may be defined as a function of the optimal flow F=[$f_{ij}$] and the ground distance D=[$d_{ij}$]. Thus, a lower Earth Mover's Distance EMD may indicate greater spatial proximity between cells in the first distribution A and cells in the second distribution B whereas a higher Earth Mover's Distance EMD may indicate less spatial proximity between the cells in the first distribution A and the cells in the second distribution B.

$$EMD(A, B) = \frac{\sum_{i=1}^{m} \sum_{j=1}^{n} d_{ij} f_{ij}}{\sum_{i=1}^{m} \sum_{j=1}^{n} f_{ij}} \tag{4}$$

Referring again to FIG. 1, the digital pathology platform 110 may generate a user interface 135 for a user 160 at the client device 130 to interact with one or more of the preprocessing engine 152, the segmentation engine 154, the phenotyping engine 156, and the spatial analysis engine 158. In some example embodiments, the user interface 135 may display, at the client device 130, one or more visual representations of the results of preprocessing, segmenting, phenotyping, and/or analyzing a microscopy image depicting a population of cells that include, for example, cells of the first phenotype A, cells of the second phenotype B, cells of the third phenotype C, and/or the like. For example, the user interface 135 may display, at the client device 130, one or more heatmaps with one or more visual indicators of the co-occurrence pattern between cells of the first phenotype A and cells of the second phenotype B.

Figure 4A:
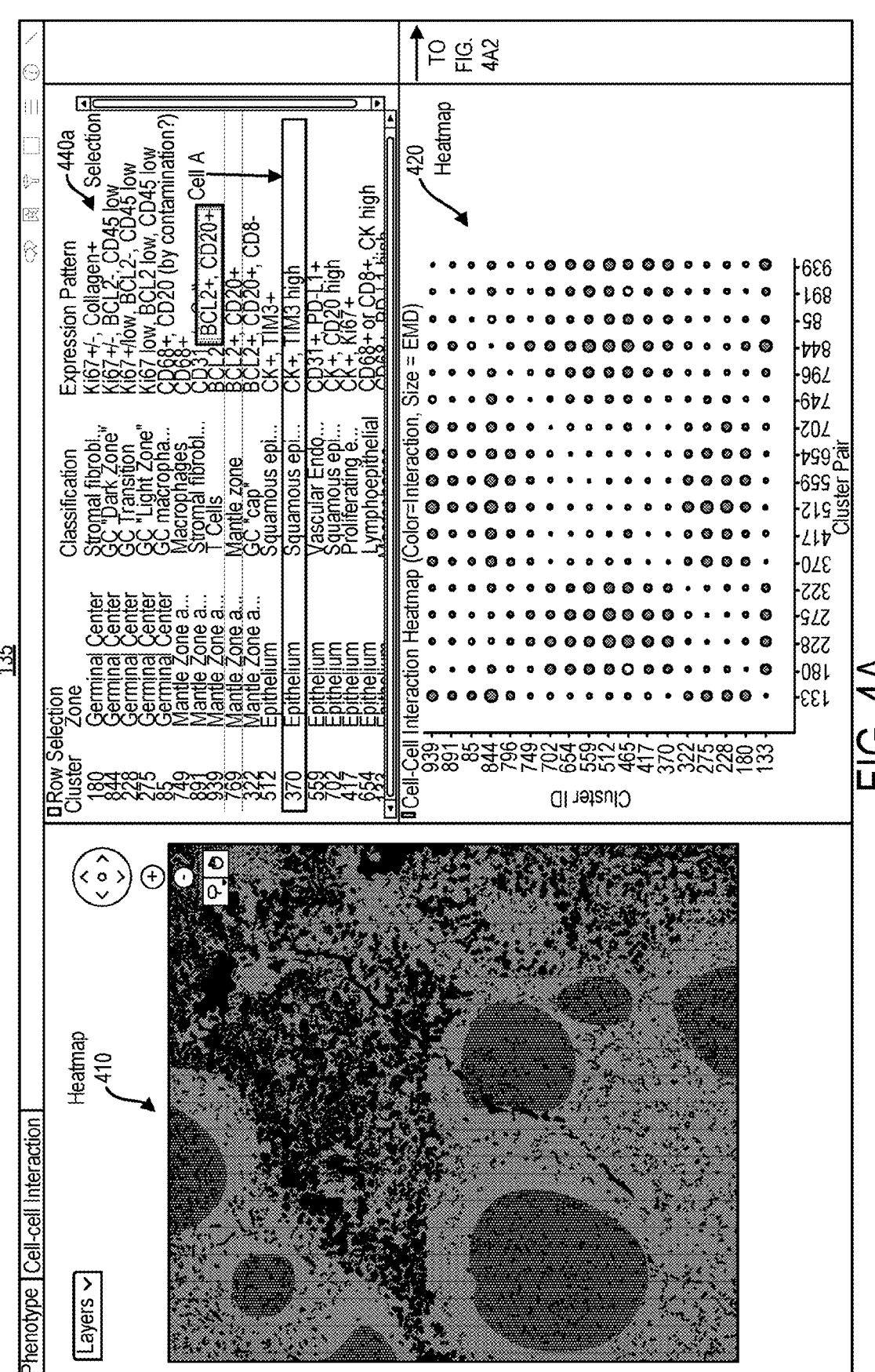
FIG. 4A depicts an example of a user interface, in accordance with some example embodiments.

To further illustrate, FIG. 4A depicts an example of the user interface 135, in accordance with some example embodiments. As shown in FIG. 4A, the user interface 135 may be a window with multiple sub-windows including, for example, a first sub-window containing a first heatmap 410, a second sub-window containing a second heatmap 420, and a third sub-window containing a third heatmap 430. Furthermore, as shown in FIG. 4A, the user interface 135 may include a fourth sub-window providing a first selection 440a of cellular phenotypes (e.g., row selection) and a second selection 440b of cellular phenotypes (e.g., column selection).

In the example shown in FIG. 4A, the first heatmap 410 may be generated to display at least a portion of a biological sample depicted in a microscopy image. This biological sample may include one or more subpopulations of cells, each of which having a different cellular phenotype. According to some example embodiments, the digital pathology platform 110 may preprocess, segment, phenotype, and analyze the microscopy image in order to identify the various cellular phenotypes present in the biological sample as well as the co-occurrence patterns that are present amongst different pairs of cellular phenotypes. For example, the first selection 440a and the second selection 440b may each include a catalogue of the cellular phenotypes that the phenotyping engine 156 determined to be present in the biological sample.

The digital pathology platform 110 may generate, based at least on the results of spatial analysis performed by the spatial analysis engine 158, the second heatmap 420 to display visual indicators of the intercellular interactions present between each pair of cellular phenotypes present in the biological sample. In the example shown in FIG. 4A, the second heatmap 420 may include, for each pair of cellular phenotypes present in the biological sample, a symbol whose color (and/or shape) corresponds to the type of co-occurrence pattern and whose size (and/or color intensity) corresponds to the magnitude of the co-occurrence pattern. For example, as between cells of the first phenotype A and the second phenotype B, the second heatmap 420 may include a dot of a first color to indicate an avoidance co-occurrence pattern, a second color to indicate an attractive co-occurrence pattern, and a third color to indicate a lack of an statistically significant co-occurrence pattern. Moreover, the size of the dot may correspond to an Earth Mover's Distance (or another metric) quantifying a difference in the spatial distribution between cells of the first phenotype A and the second phenotype B.

The digital pathology platform 110 may generate, based at least on the results of spatial analysis performed by the spatial analysis engine 158, the second heatmap 420 to display visual indicators of the quantities of cells of different cellular phenotypes present in the biological sample. In the example shown in FIG. 4A, the third heatmap 430 may include, for each pair of cellular phenotypes present in the biological sample, a symbol whose color, color intensity, shape, and/or size correspond to a difference between the average quantities of the cells present in various portions of the biological sample (e.g., various "neighborhoods" of a radius r) compared to the quantities of the cells that would be present in the case of a chance (or random) distribution.

As shown in FIG. 4A, the digital pathology platform 110 may receive, via the first selection 440a, one or more user inputs selecting the first phenotype A. The digital pathology platform 110 may also receive, via the second selection 440b, one or more user inputs selecting the second phenotype B. In accordance with these selections, the digital pathology platform 110 may generate (or update) the first heatmap 410 to display visual indicators of the co-occurrence pattern between cells of the first phenotype A and cells of the second phenotype B. For example, to enable a visual differentiation between cells of the first phenotype A and cells of the second phenotype B as well as the relative spatial distribution, the first heatmap 410 may depict cells of the first phenotype A in a first color and cells of the second phenotype B in a second color. Moreover, the first heatmap 410 may display the unselected cellular phenotypes present in the biological sample, such as cells of the third phenotype C, in a third color.

Figure 4B:
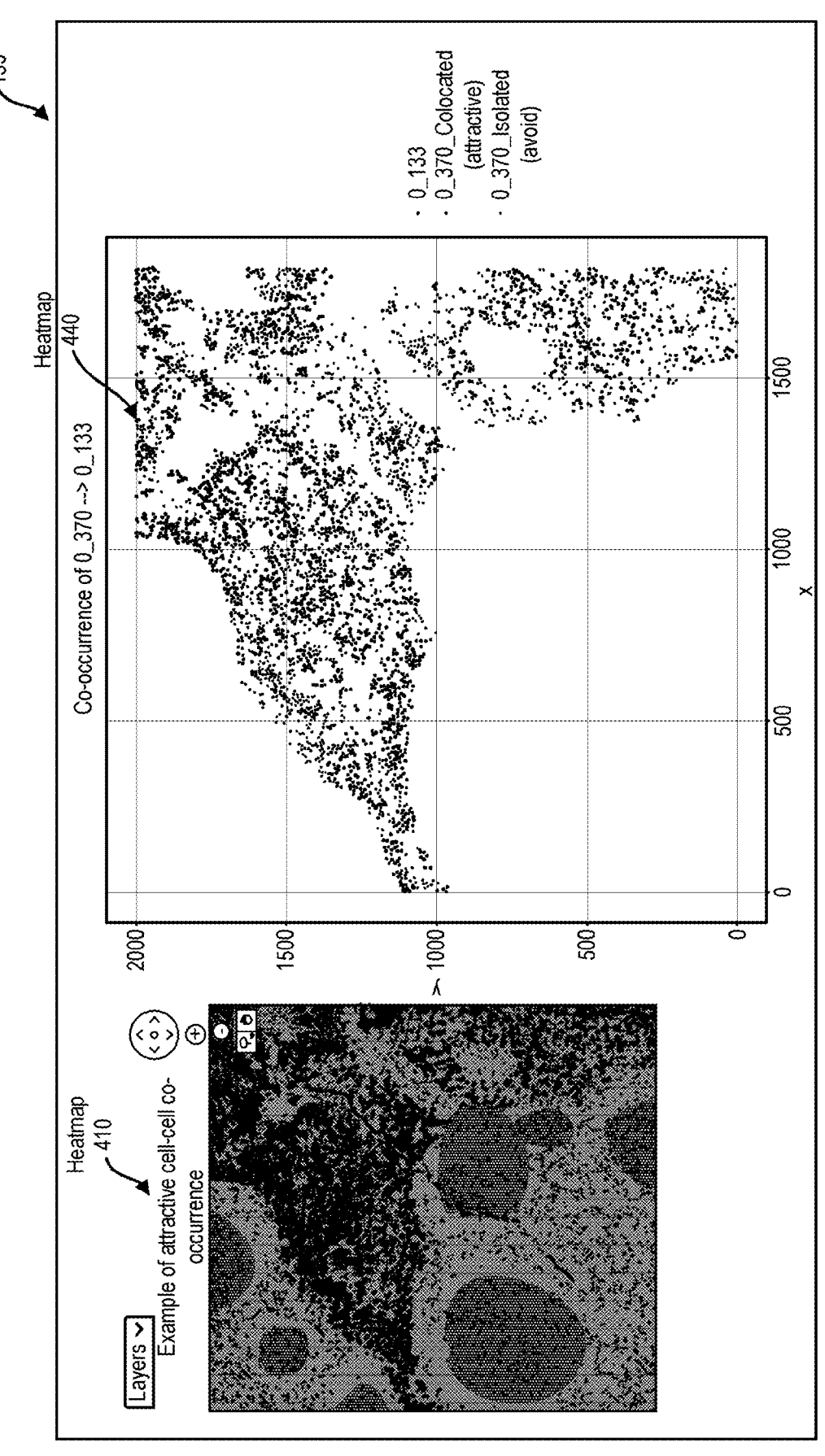
FIG. 4B depicts another example of a user interface, in accordance with some example embodiments.

As noted, the global co-occurrence pattern between cells of the first phenotype A and cells of the second phenotype B across the entire biological sample may different from the local co-occurrence pattern that is present in various portions of the biological sample. The example of the first heatmap 410 shown in FIG. 4A depicts a global attractive co-occurrence pattern between cells of the first phenotype A and cells of the second phenotype B. FIG. 4B depicts an example of the user interface 135 that includes, in addition to the first heatmap 410 illustrating the global co-occurrence pattern between cells of the first phenotype A and cells of the second phenotype B, a fourth heatmap 440 showing the local co-occurrence patterns between cells of the first phenotype A and cells of the second phenotype B.

In some instances, one heatmap may show a global cell co-occurrence relationship while another heatmap shows a local co-occurrence relationship. The global relationship and the local relationship may be consistent, or they may show discrepancies. For instance, although the first heatmap 410 shows that cells of the first phenotype A and cells of the second phenotype B exhibit an attractive co-occurrence pattern globally (e.g., across the entire biological sample), the fourth heatmap 440 shows that, on a local level, at least some cells of the first phenotype A and cells of the second phenotype B may exhibit an avoidance co-occurrence pattern or a statistically insignificant co-occurrence pattern. To provide a visual representation of the local co-occurrence patterns, the fourth heatmap 440 may depict cells of the first phenotype A in a first color (or symbol) while cells of the second phenotype B may be shown using a color (or symbol) indicative of the corresponding local occurrence pattern. For example, cells of the second phenotype B that exhibit an attractive local co-occurrence pattern with respect to cells of the first phenotype A may be shown in a second color (or symbol) whereas cells of the second phenotype B that exhibit an avoidance local co-occurrence pattern with respect to cells of the first phenotype A may be shown in a third color (or symbol).

In some embodiments, the digital pathology platform 110 may selectively display user interfaces or heatmaps, depending on a relationship between a global and local co-occurrence pattern. For instance, one embodiment of the digital pathology platform 110 may guide a user to review heatmaps in which global and local co-occurrence patterns diverge. For example, the digital pathology platform 110 may selectively first display the diverging heatmaps to a user in a prioritized workflow, for a user to validate or review. In other instances, the digital pathology platform 110 may present a guided workflow in which users first view heatmaps in which global and local co-occurrence patterns are consistent, as in, local co-occurrence patterns may validate or verify global co-occurrence patterns. In short, the digital pathology platform 110 may provide adaptive or varying workflows (or sequences of user interfaces and displays), depending on user analyses, analysis interests, preconfigured settings, or a combination thereof.

Figure 5A:
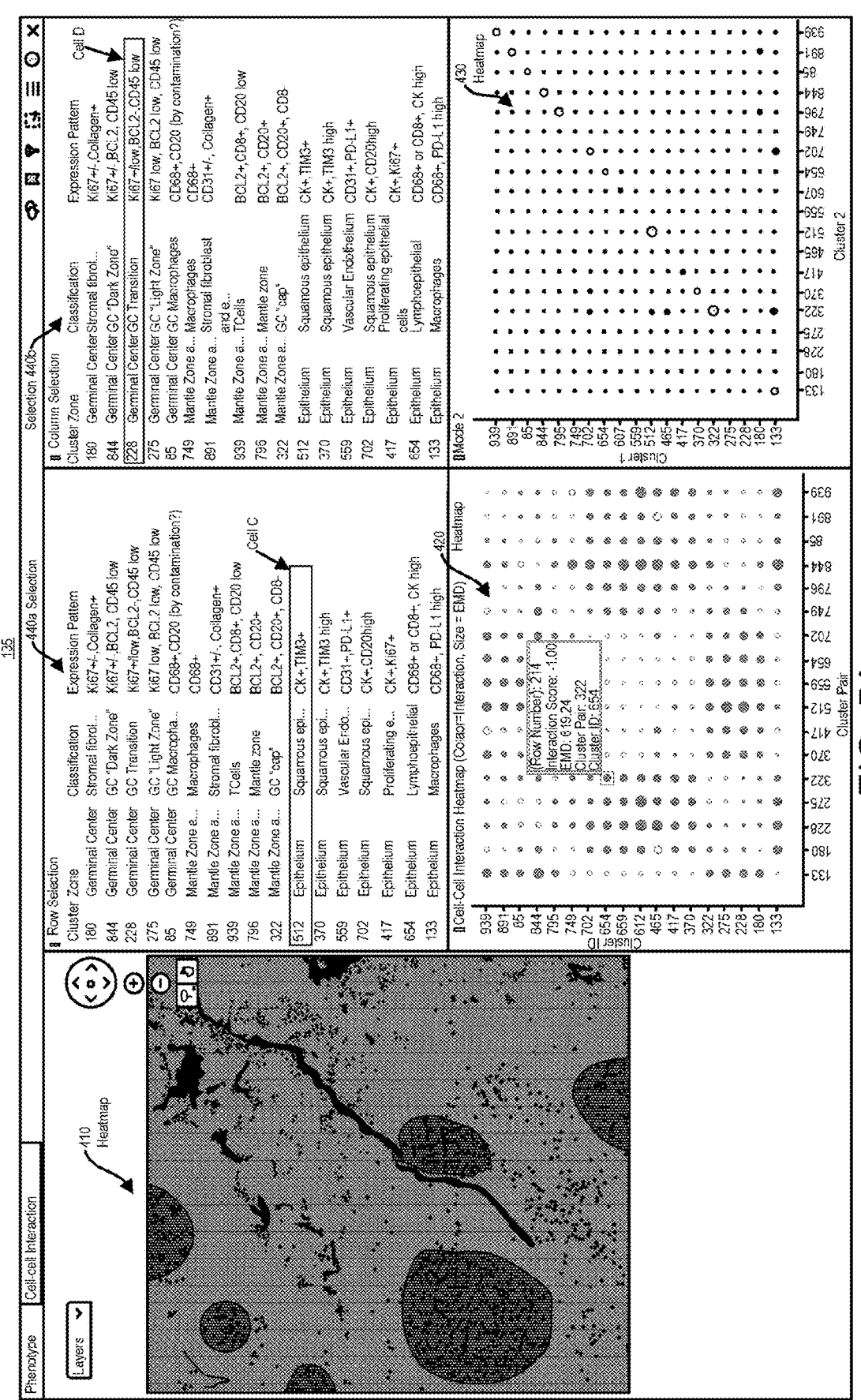
FIG. 5A depicts an example of a user interface, in accordance with some example embodiments.

FIG. 5A depicts another example of the user interface 135 in which the first heatmap 410 depicts a global avoidance co-occurrence pattern between, for example, cells of the third phenotype C and cells of a fourth phenotype D that are also present in the same biological sample depicted in the microscopy image. For example, in response to receiving, via the first selection 440*a* and the second selection 440*b* respectively, one or more inputs selecting the third phenotype C and the fourth phenotype D, the digital pathology platform 110 may generate (or update) the first heatmap 410 to display visual indicators of the co-occurrence pattern between cells of the third phenotype C and cells of the fourth phenotype D. For example, the first heatmap 410 may depict cells of the third phenotype C in a first color and cells of the fourth phenotype D in a second color. Moreover, the first heatmap 410 may display the unselected cellular phenotypes present in the biological sample, which in this case may include cells of the first phenotype A and the second phenotype B, in a third color.

Figure 5B:
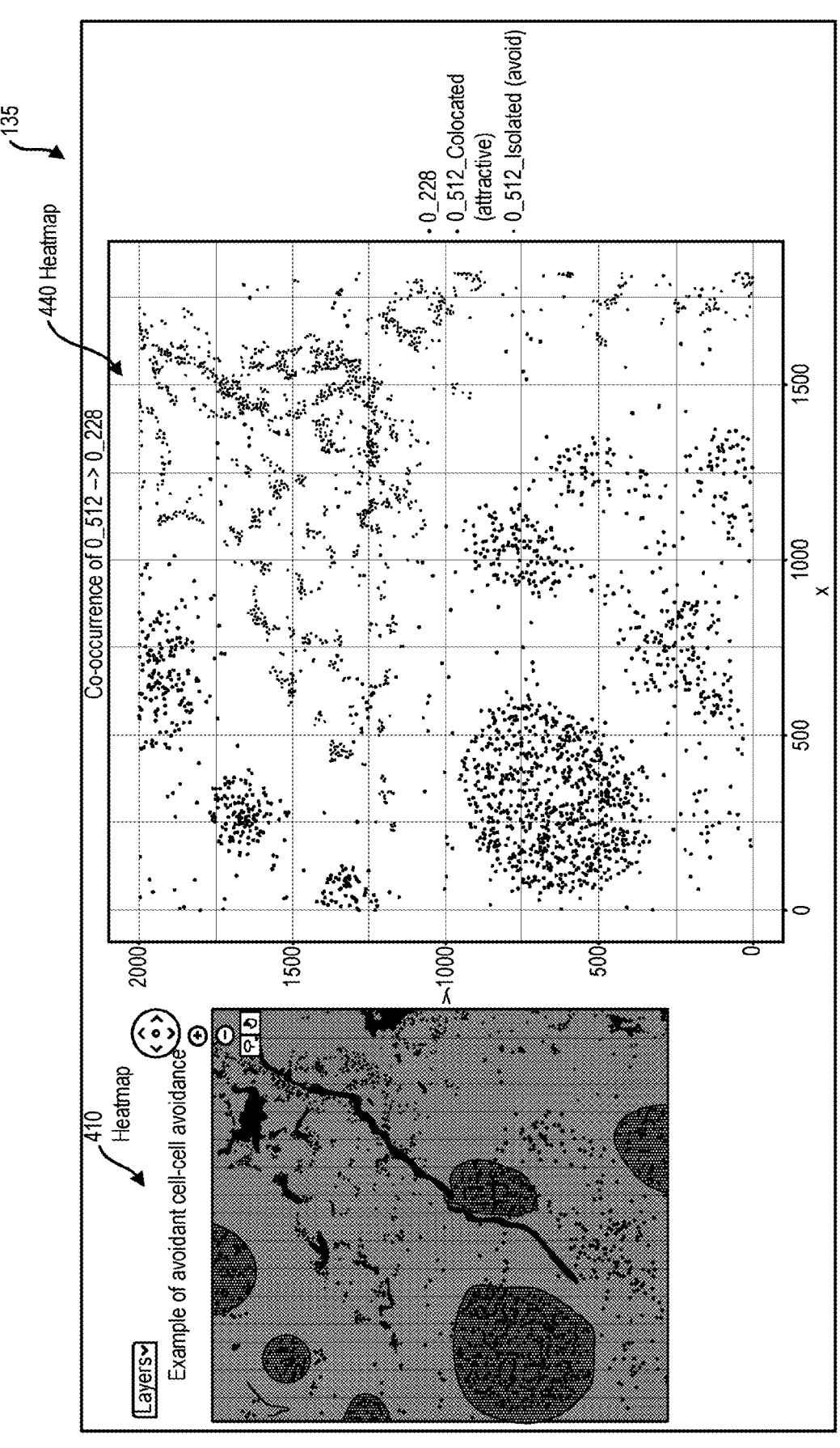
FIG. 5B depicts another example of a user interface, in accordance with some example embodiments.

Referring to FIG. 5B, the digital pathology platform 110 may also generate (or update) the user interface 135 to include the fourth heatmap 440, which may show the local co-occurrence patterns between cells of the third phenotype C and cells of the fourth phenotype D. Although the first heatmap 410 shows that cells of the third phenotype C and cells of the fourth phenotype D exhibit an avoidance co-occurrence pattern globally (e.g., across the entire biological sample), the fourth heatmap 440 may show cells of the fourth phenotype D using different colors (or symbols) indicative of the corresponding local occurrence pattern in order to depict that, on a local level, at least some cells of the third phenotype C and cells of the fourth phenotype D may exhibit an attractive co-occurrence pattern or a statistically insignificant co-occurrence pattern.

In some example embodiments, the digital pathology platform 110 may support a comparative analysis, for example, between a first microscopy image depicting a first biological sample and a second microscopy image depicting a second biological sample. For example, the first biological sample may be an untreated, control sample and the second biological sample may be subjected to a treatment. Alternatively, the first biological sample may be a subjected to a first treatment and the second biological sample may be subjected to a second treatment. The comparative analysis may include a comparison of the global co-occurrence patterns and/or local co-occurrence patterns that are present in each of the first biological sample and the second biological sample. Differences in co-occurrence patterns may be attributable to the treatment that each of the first biological sample and the second biological sample is (or is not) exposed to. Thus, the comparative analysis between the first biological sample and the second biological sample may reveal insights into how a particular treatment affects a tumor microenvironment (TME) including various biological processes such as tissue formation, homeostasis, regeneration, immune response, and/or the like.

In some example embodiments, the digital pathology platform 110 may support a comparative analysis workflow that includes preprocessing, segmenting, phenotyping, and analyzing each of the first microscopy image depicting the first biological sample and the second microscopy image depicting the second biological sample. Moreover, the user interface 135 may be generated (or updated) to display the results of the comparative analysis workflow. To further illustrate, FIG. 6A depicts another example of the user interface 135, which depicts the respective results of preprocessing, segmenting, phenotyping, and analyzing a first microscopy image depicting a control biological sample and a second microscopy image depicting a treated biological sample.

Figure 6A:
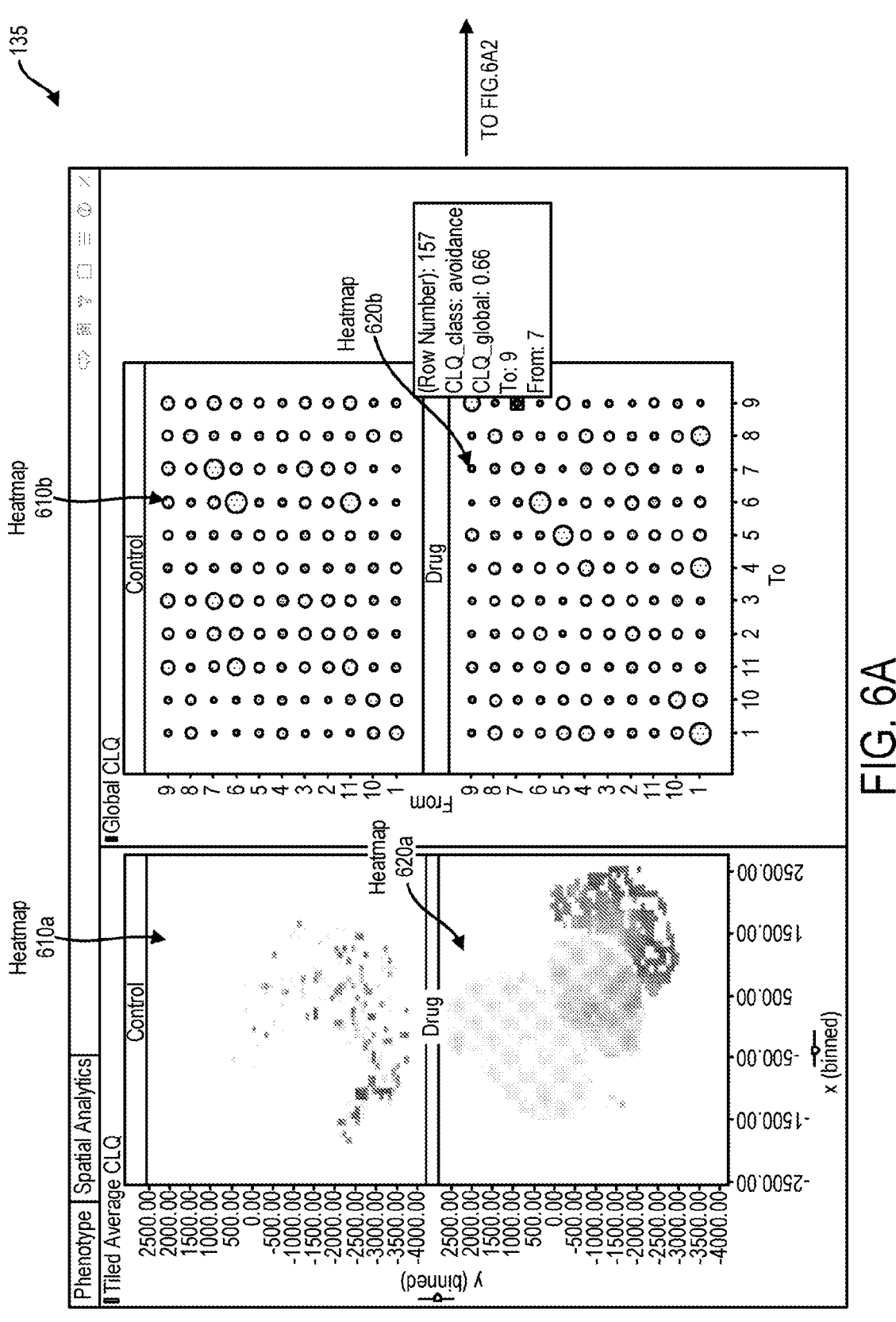
FIG. 6A depicts another example of a user interface, in accordance with some example embodiments.
Figure 6A:
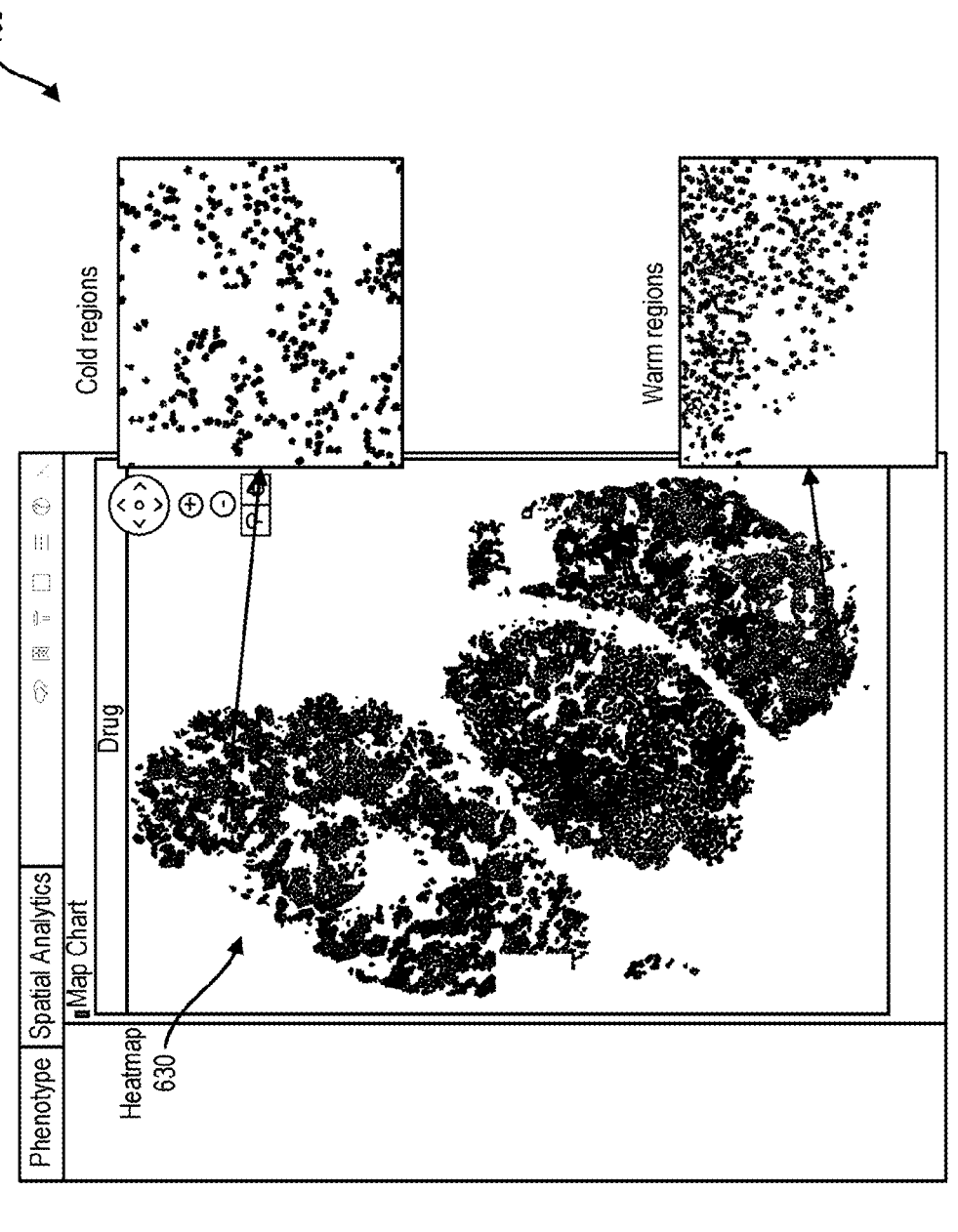

As shown in FIG. 6A, the user interface 135 may be a window with multiple sub-windows including, for example, a first sub-window containing a first heatmap 610*a*, a second sub-window containing a second heatmap 610*b*, a third sub-window containing a third heatmap 620*a*, a fourth sub-window containing a fourth heatmap 620*b*, and a fifth sub-window containing a fifth heatmap 630. In the example of the user interface 135 shown in FIG. 6A, the second heatmap 610*b* may display visual indicators of the intercellular interactions present between each pair of cellular phenotypes present in the control biological sample while the fourth heatmap 620*b* may display visual indicators of the intercellular interactions present between each pair of cellular phenotypes present in the treated biological sample. Each visual indicator may be a symbol whose color (and/or shape) corresponds to the type of co-occurrence pattern (e.g., attractive, avoidance, statistically insignificant, and/or the like) and whose size (and/or color intensity) corresponds to the magnitude of the co-occurrence pattern (e.g., as measured by a colocation quotient, an Earth Mover's Distance (EMD), and/or the like.

In the example shown in FIG. 6A, the digital pathology platform 110 may receive, via the fourth heatmap 620*b*, a selection of a pair of cellular phenotypes from the treated biological sample for further investigation. For example, the digital pathology platform 110 may receive one or more user inputs selecting, from the fourth heatmap 620*b*, a visual indicator corresponding to the first phenotype A and the second phenotype B present in the treated biological sample. In response to receiving the one or more user inputs selecting the first phenotype A and the second phenotype B present in the treated biological sample, the digital pathology platform 110 may generate (or update) the third heatmap 620*a* and the fifth heatmap 630 to display visual indicators of the co-occurrence pattern between cells of the first phenotype A and cells of the second phenotype B within the treated biological sample.

For example, referring again to FIG. 6A, the third heatmap 620*a* may be generated (or updated) to provide visual indicators of the global co-occurrence pattern between cells of the first phenotype A and cells of the second phenotype B within the treated biological sample. These visual indicators may include a first color (and/or symbol) indicative of a cell of the first phenotype A and a second color (and/or symbol) indicative of a cell of the second phenotype B. The fifth heatmap 630 may be generated (or updated) to provide visual indicators of the local co-occurrence patterns that exist between cells of the first phenotype A and cells of the second phenotype B within the treated biological sample. These visual indicators may include, for example, a first color (and/or symbol) indicative of a cell of the first phenotype A, a second color (and/or symbol) indicative of a cell of the second phenotype B that is attractively co-located with respect to cells of the first phenotype A, a third color (and/or symbol) indicative of a cell of the second phenotype B that is avoidantly co-located with respect to cells of the first phenotype A, and/or the like.

In some instances, these visual indicators may further include different colors (and/or symbols) to indicate varying magnitudes of the co-occurrence pattern. For example, cells of the second phenotype B that exhibit a strong (e.g., above threshold) attractive co-occurrence pattern relative to cells of the first phenotype A may be displayed in the second color (and/or symbol) whereas cells of the second phenotype B that exhibit a weak (e.g., below threshold) attractive co-occurrence pattern relative to cells of the first phenotype A may be displayed in a fourth color (and/or symbol). The strength (or weakness) of an attractive co-occurrence pattern may be determined relative to a threshold in which case the second color (and/or symbol) may indicate an above-threshold attractive co-occurrence pattern while the fourth color (and/or symbol) may indicate a below-threshold attractive co-occurrence pattern.

The aforementioned use of different visual indicators to denote varying magnitudes of co-occurrence patterns may enable a visual identification of different zones within the treated biological sample. For example, as shown in FIG. 6A, the treated biological sample may include "warm regions" in which cells of the first phenotype A and cells of the second phenotype B exhibit a strong attractive co-occurrence pattern (e.g., an above-threshold attractive co-occurrence pattern). The treated biological sample may also include "cold regions" wherein cells of the first phenotype A and cells of the second phenotype B exhibit a strong avoidance co-occurrence pattern (e.g., an above-threshold avoidance co-occurrence pattern). The strength (or weakness) of an avoidance co-occurrence pattern may also be determined relative to a threshold. Accordingly, different colors (and/or symbols) may be used to provide a visual differentiation between zones exhibiting an above-threshold avoidance co-occurrence pattern and zones exhibiting a below-threshold avoidance co-occurrence pattern.

Figure 6B:
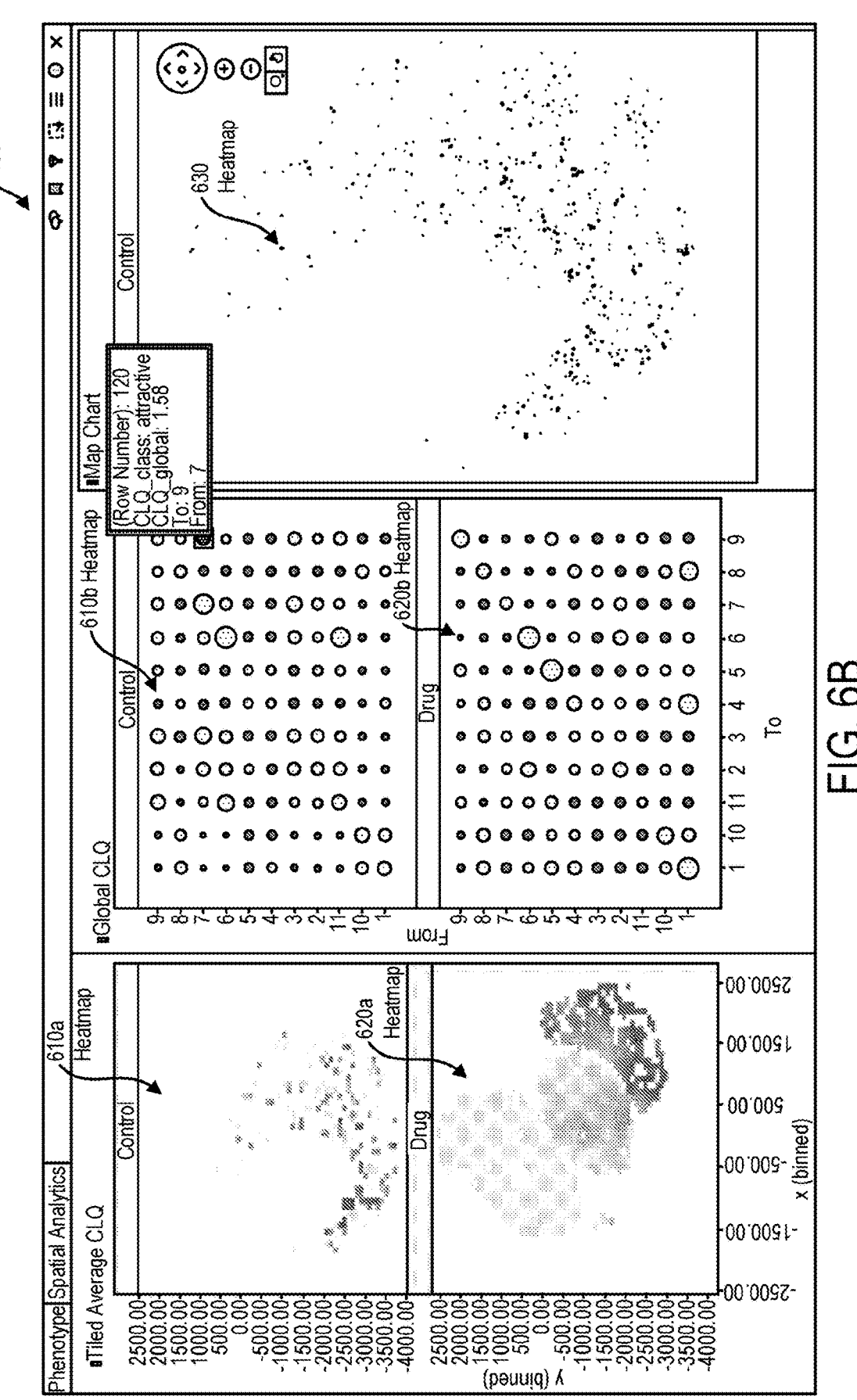
FIG. 6B depicts another example of a user interface, in accordance with some example embodiments.

In the example shown in FIG. 6B, the digital pathology platform 110 may receive, via the second heatmap 610b, a selection of a pair of cellular phenotypes from the control biological sample for further investigation. For example, the digital pathology platform 110 may receive one or more user inputs selecting, from the second heatmap 610b, a visual indicator corresponding to the first phenotype A and the second phenotype B present in the control biological sample. In response to receiving the one or more user inputs selecting the first phenotype A and the second phenotype B present in the control biological sample, the digital pathology platform 110 may generate (or update) the first heatmap 610a and the fifth heatmap 630 to display visual indicators of the co-occurrence pattern between cells of the first phenotype A and cells of the second phenotype B within the control biological sample. For instance, the first heatmap 610a may be generated (or updated) to depict the global co-occurrence pattern present across the entire control biological sample whereas the fifth heatmap 630 may be generated (or updated) to depict the local co-occurrence patterns present within different portions of the control biological sample.

Figure 6C:
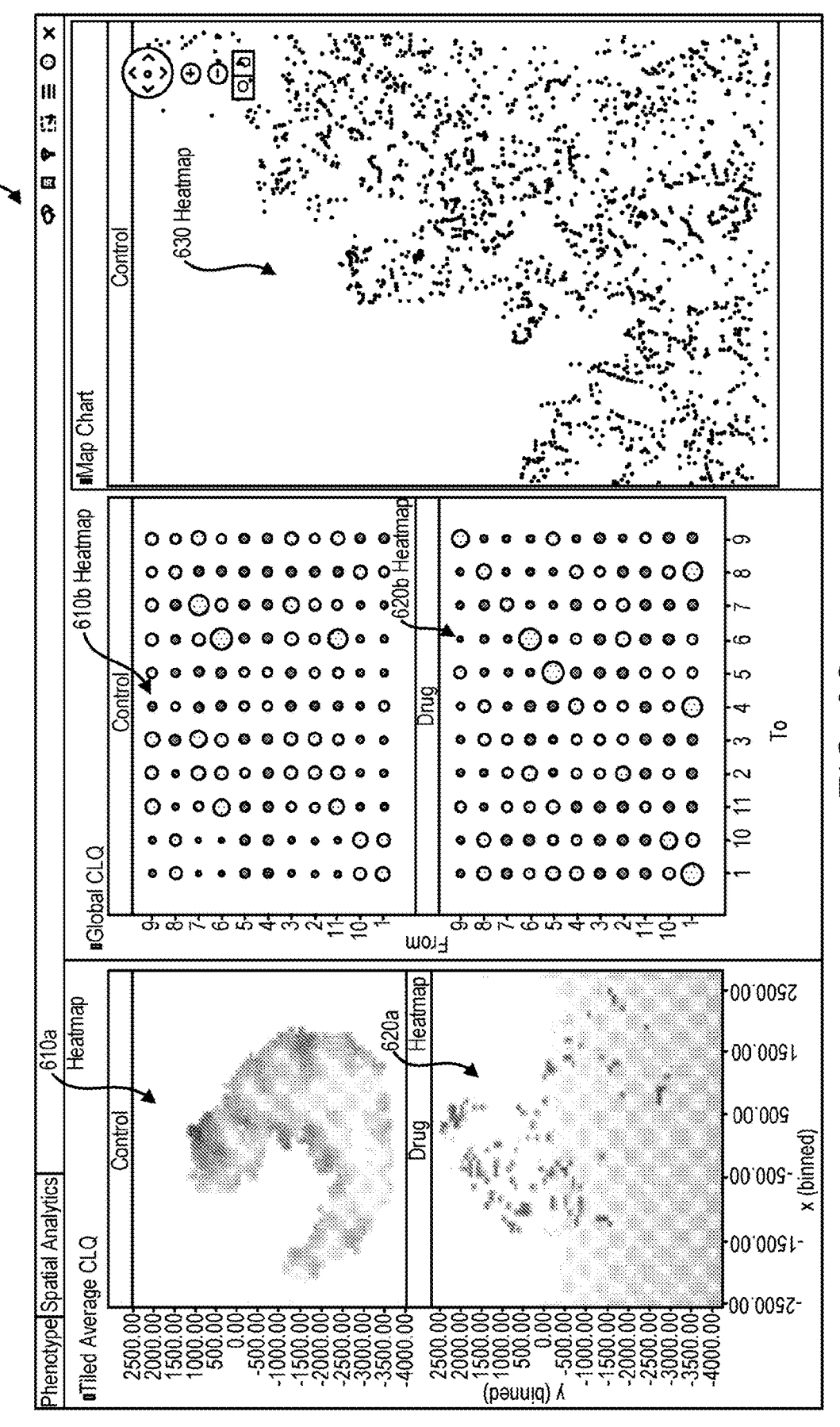
FIG. 6C depicts another example of a user interface, in accordance with some example embodiments.

In some example embodiments, the user interface 135 may be interactive such that the contents of the one or more visual representations included in the user interface 135 may be updated in response to one or more user inputs. In one example shown in FIG. 6C, the one or more inputs may specify a zoom, a magnification level, and/or a field of view of a visual representation such as the fifth heatmap 630. As shown in FIG. 6C, the one or more user inputs may increment the zoom or magnification of the fifth heatmap 630 in order enhance the clarity of the local heterogeneity (e.g., the local co-occurrence patterns) that is present in a select portion of the fifth heatmap 630.

Figure 7A:
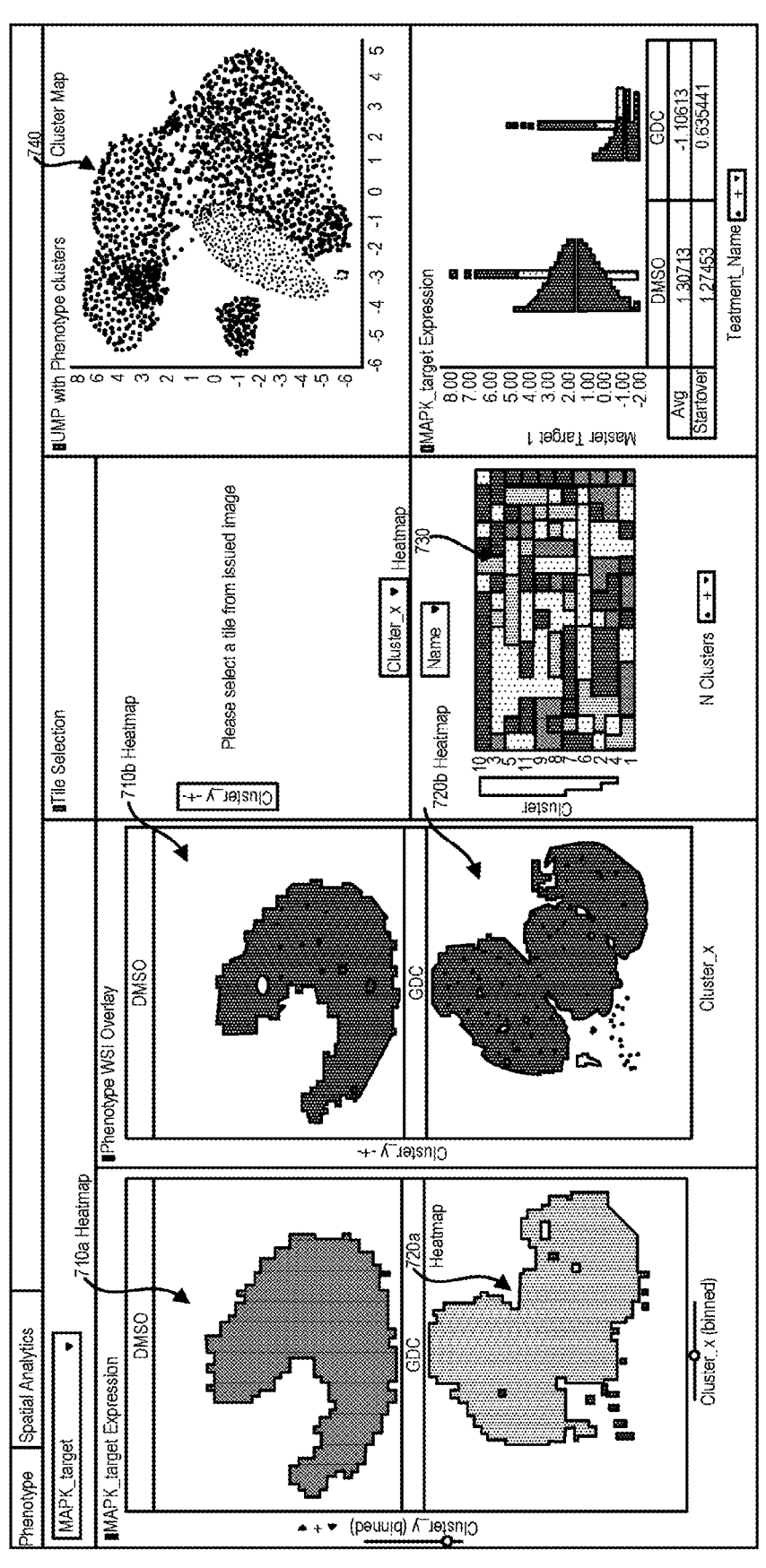
FIG. 7A depicts another example of a user interface, in accordance with some example embodiments.
Figure 7B:
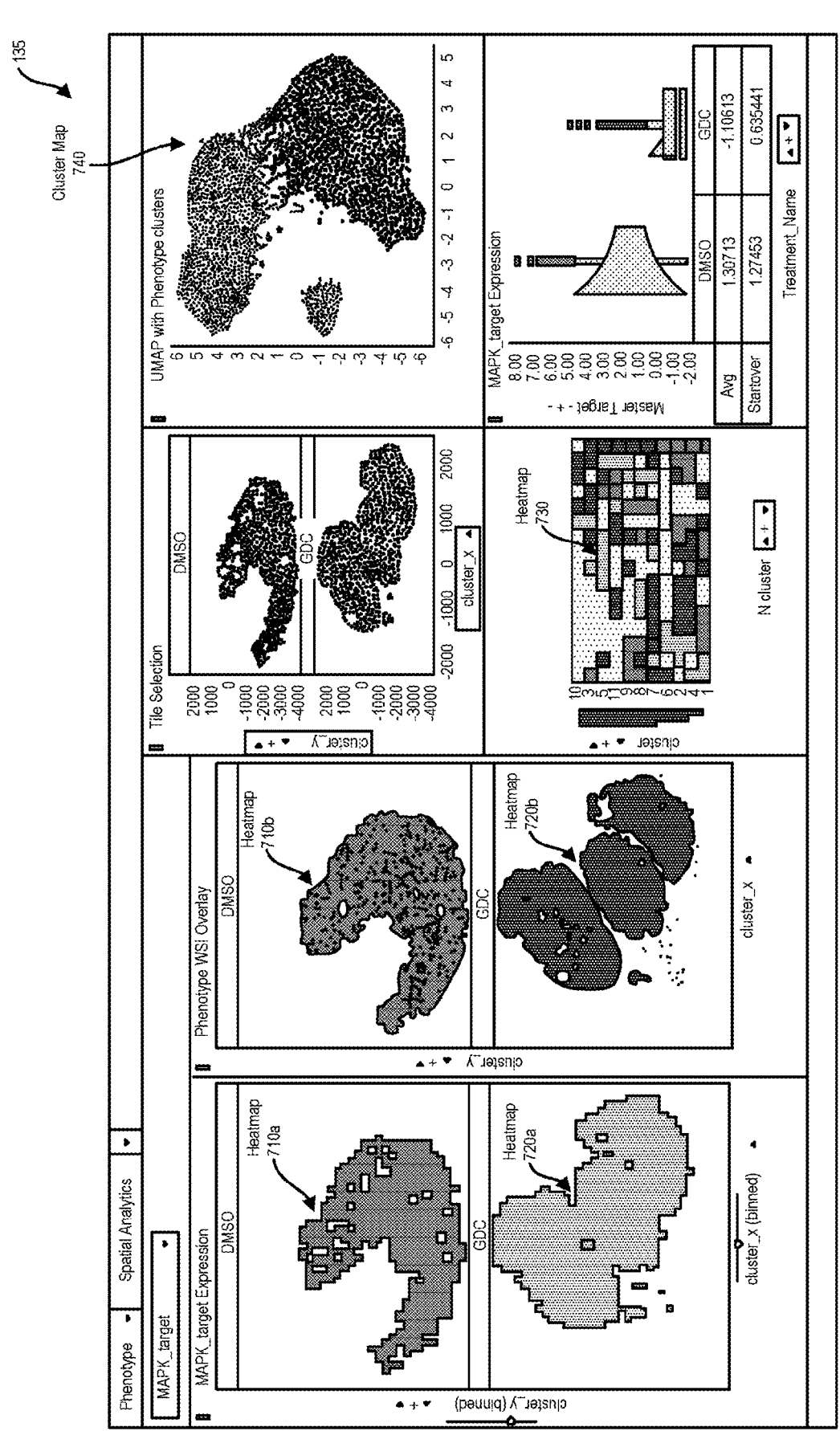
FIG. 7B depicts another example of a user interface, in accordance with some example embodiments.

FIGS. 7A-7B depict another example of interaction with the user interface 135 in which the one or more user inputs specify a subset of cells present in a biological sample depicted in a microscopy image. Referring to FIGS. 7A-7B, the user interface 135 may include a first heatmap 710a and a second heatmap 710b associated with a first biological sample. Furthermore, the user interface 135 may include a third heatmap 720a and a fourth heatmap 720b associated with a second biological sample. The first biological sample and the second biological sample may each contain a selection of cellular phenotypes. The co-occurrence pattern that exists between each pair of cellular phenotypes may be shown in a fifth heatmap 730. For example, in the example shown in FIGS. 7A-7B, the fifth heatmap 730 may include, for each pair of cellular phenotypes present in the biological sample, a visual indicator whose color (and/or shape) corresponds to the type of co-occurrence pattern and whose color intensity (and/or size) corresponds to the magnitude of the co-occurrence pattern.

In the example shown in FIGS. 7A-7B, the user interface 135 may further include a cluster map 740, which may be generated based at least on the results of the phenotyping engine 156 determining a phenotype for each of the cells present in the first biological sample and the second biological sample. As noted, the phenotyping engine 156 may apply one or more machine learning based techniques to identify subpopulations of cells having different phenotypes through dimensionality reduction, cluster analysis, and/or the like. Examples of dimensionality reduction techniques may include uniform manifold approximation and projection (UMAP), which is shown in FIGS. 7A-7B, as well as principal component analysis (PCA), T-distributed Stochastic Neighbor Embedding (t-SNE), and/or the like. Meanwhile, examples of cluster analysis techniques include k-means clustering, mean-shift clustering, density-based spatial clustering of applications with noise (DBSCAN), expectation-maximization (EM) clustering using Gaussian mixture models (GMM), and agglomerative hierarchical clustering. The resulting cluster map 740 may show one or more clusters of cells, each of which corresponding to cells having a same cellular phenotype.

One mechanism for selecting a subset of cellular phenotypes of further analysis may be to select, from the fifth heatmap 730, a visual indicator corresponding to a pair of cellular phenotypes present in each of the first biological sample and the second biological sample. Alternatively, in the example shown in FIGS. 7A-7B, a subset of cellular phenotypes may be selected by one or more user inputs specifying one or more corresponding clusters of cells in the cluster map 740. For example, FIG. 7A shows the one or more inputs specifying, in the cluster map 740, one or more clusters of cells corresponding to the first phenotype A, the second phenotype B, and/or the like. In response to the one or more user inputs, FIG. 7B shows that the digital pathology platform 110 may generate (or update) the user interface 135, including the first heatmap 710a, the second heatmap 710b, the third heatmap 720a, and the fourth heatmap 720b, to display a visual representation of the co-occurrence patterns associated with cells of the first phenotype A, cells of the second phenotype B, and/or the like.

In some example embodiments, the digital pathology platform 110 may support a comparative analysis of the different gene expression profiles that are associated with the co-occurrence patterns (e.g., attractive, avoidant, or statistically insignificant) present within a biological sample. As noted, the phenotyping engine 156 may determine, for each cell depicted in a microscopy image of the biological sample, a phenotype that includes individual cellular features such as gene expressions (e.g., ribonucleic acid (RNA) and/or the like). For example, the phenotyping engine 156 may apply a machine learning based technique, such as principal component analysis (PCA), uniform manifold approximation and projection (UMAP), and T-distributed Stochastic Neighbor Embedding (t-SNE), to gene expression data associated with the cells depicted in the microscopy image of the biological sample. In doing so, the phenotyping engine 156 may identify, within the population of cells depicted in the microscopy image, a first subpopulation of cells having a first phenotype A associated with a first gene expression profile A and a second subpopulation of cells having a second phenotype B associated with a second gene expression profile B.

Figure 10A:
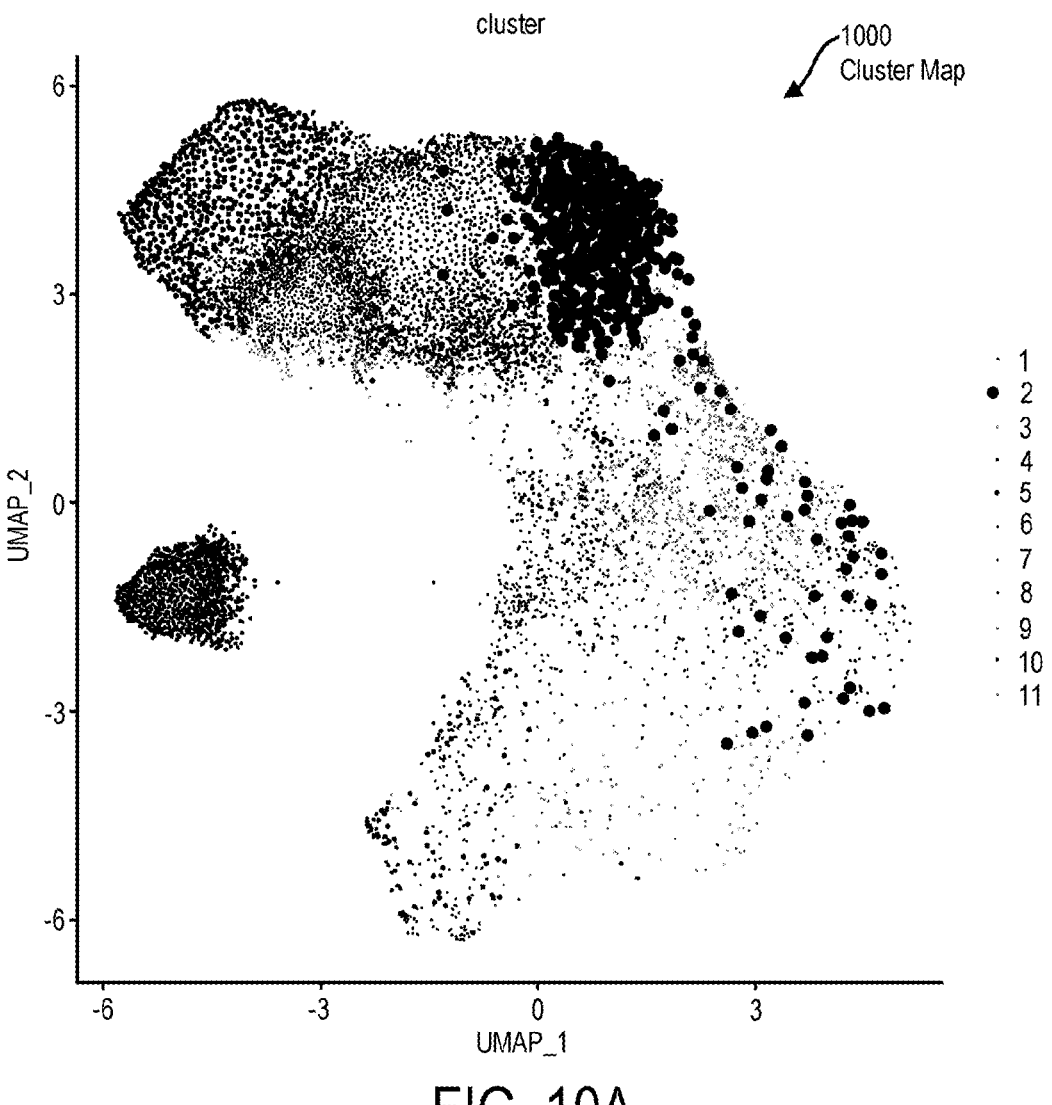
FIG. 10A depicts a screenshot illustrating an example of a user interface for gene expression analysis, in accordance with some example embodiments.

FIG. 10A depicts an example of a cluster map 1000 of the cells present in an epithelial tumor sample, which may be displayed as a part of the user interface 135 at the client device 130. According to some example embodiments, the phenotyping engine 156 may apply a dimensionality reduction technique to the gene expression data of the cells depicted in a microscopy image of the biological sample, thereby generating a reduced dimension representation of gene expression data to provide a visualization the relationship between individual cells and the cluster membership of each cell. For example, the cluster map 1000 shown in FIG. 10A corresponds to a uniform manifold approximation and projection (UMAP) projection (e.g., in two-dimensional space) that includes ten subpopulations of cells. In the cluster map 1000, the cells in Cluster 10 may be characterized as mesenchymal-like tumor cells based on the pattern of gene expression exhibited by these cells.

As noted, the digital pathology platform 110 may support a comparative analysis of the different gene expression profiles that are associated with the co-occurrence patterns (e.g., attractive, avoidant, or statistically insignificant) present within a biological sample. In some cases, this comparative analysis may include performing a differential gene expression analysis between the gene expression profiles of a first group of cells (e.g., in a first cell cluster) that exhibit an avoidance co-occurrence pattern relative to other cells in the biological sample and the gene expression profiles of a second group of cells (e.g., in the first cell cluster) that exhibit an attractive co-occurrence pattern relative to the other cells in the biological sample. The differential gene expression analysis may include one or more specific groups of other cells in the biological sample, such as cells in a second cell cluster that exhibit the avoidance or attractive co-occurrence pattern relative to the cells in the first cell cluster. Alternatively and/or additionally, the differential gene expression analysis may encompass every other cells in the biological sample that may be attractively or avoidantly co-located relative to the cells in the first cell cluster.

Figure 10B:
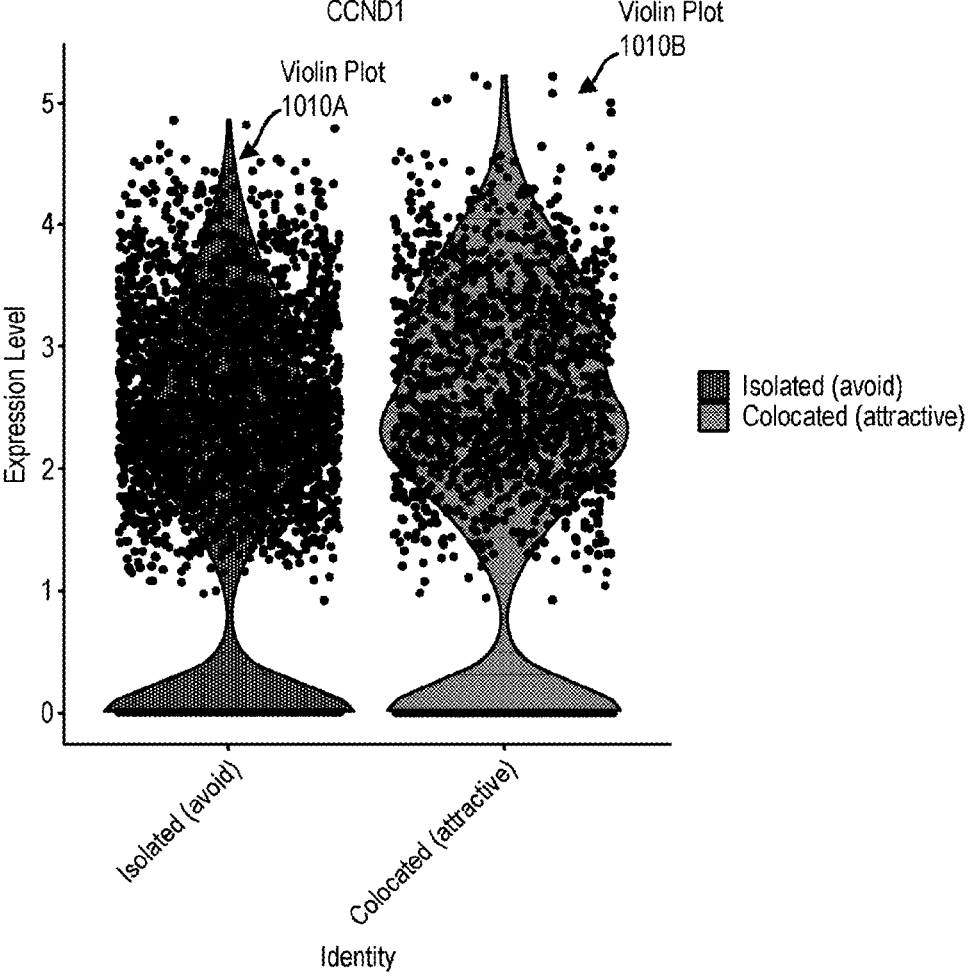
FIG. 10B depicts a screenshot illustrating an example of a user interface for gene expression analysis, in accordance with some example embodiments.

For the epithelial tumor sample shown in FIG. 10A, for example, the digital pathology platform 110 may perform the comparative analysis to determine differences in the gene expression profiles of the mesenchymal-like cells in Cluster 10 categorized as being either avoidant or attractive to the cells in Cluster 1. FIG. 10B depicts two examples of violin plots 1010 that may be displayed as a part of the user interface 135 to provide a visualization of the expression levels of the Cyclin D1 (CCND1) protein coding gene exhibited by the mesenchymal-like cells in Cluster 10. In the example shown in FIG. 10B, a first violin plot 1010A may depict the distribution of Cyclin D1 (CCND1) expression levels (along the y-axis) exhibited by the mesenchymal-like cells in Cluster 10 that are in an avoidance co-occurrence pattern (e.g., isolated) from one or more specific subpopulations of cells present in the epithelial tumor sample such as the cells in Cluster 1. Meanwhile, the distribution of Cyclin D1 (CCND1) expression levels (along the y-axis) exhibited by the mesenchymal-like cells in Cluster 10 that are in an attractive co-occurrence pattern (e.g., colocated) from the cells in Cluster 1 are shown in a second violin plot 1010B.

Figure 10C:
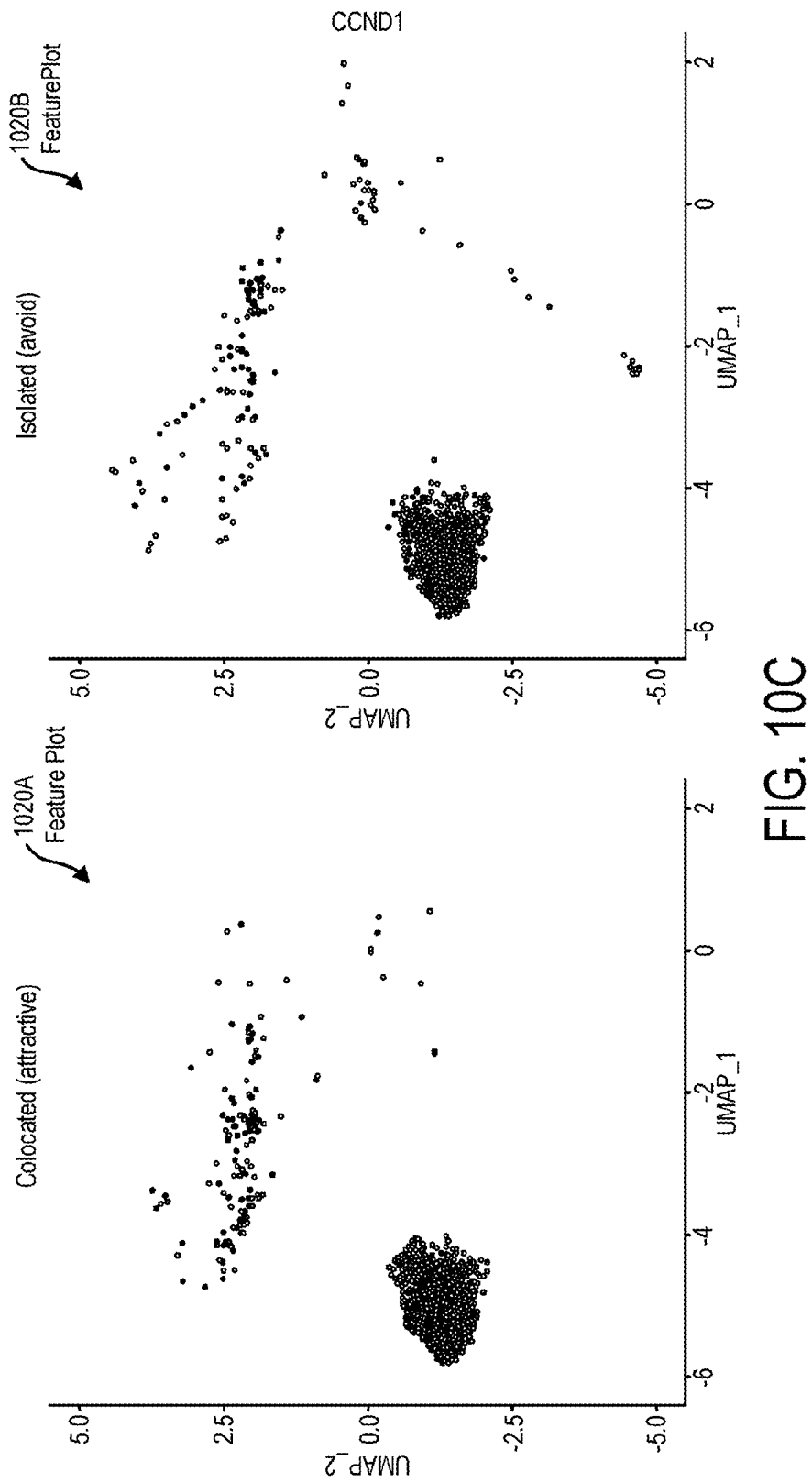
FIG. 10C depicts a screenshot illustrating an example of a user interface for gene expression analysis, in accordance with some example embodiments.

FIG. 10C depicts two examples of feature plots 1020 that may be displayed as a part of the user interface 135 to provide a visualization of the expression levels of the Cyclin D1 (CCND1) protein coding gene exhibited by the mesenchymal-like cells in Cluster 10. Referring to FIG. 10C, a first feature plot 1020A may depict the Cyclin D1 (CCND1) expression levels of the mesenchymal-like cells in Cluster 10 as well as the Cyclin D1 (CCND1) expression levels of the other cells in the epithelial tumor sample that exhibit in an attractive co-occurrence pattern (e.g., attractive) relative to the mesenchymal-like cells in Cluster 10. Meanwhile, a second feature plot 1020B may depict the Cyclin D1 (CCND1) expression levels of the mesenchymal-like cells in Cluster 10 as well as the Cyclin D1 (CCND1) expression levels of the other cells in the epithelial tumor sample that exhibit in an avoidance co-occurrence pattern (e.g., attractive) relative to the mesenchymal-like cells in Cluster 10. It should be appreciated that the expression levels of a particular gene may be visually represented using differences in the shape, color, and/or size of the symbol representative of each cell. In the example of the feature graphs 1020 shown in FIG. 10C, for example, individual cells may be represented as points on the feature graphs 1020 while the color intensity of each point may correspond to the magnitude of Cyclin D1 (CCND1) expression level of each cell.

FIG. 8A depicts a flowchart illustrating an example of a process 800 for spatial analysis, in accordance with some example embodiments. Referring to FIGS. 1-7 and 8A, the process 800 may be performed by the digital pathology platform 110, for example, by the preprocessing engine 152, the segmentation engine 154, the phenotyping engine 156, and the spatial analysis engine 158.

At 802, the digital pathology platform 110 may preprocess an microscopy image depicting a first biological sample. In some example embodiments, the digital pathology platform 110, for example, the preprocessing engine 152, may preprocess a microscopy image (e.g., a digitized microscope image such as a whole slide microscopy image and/or the like) to convert the format of the microscopy image from a first format to a second format. For example, the digital pathology platform 110 may receive, from the imaging system 120, the microscopy image in a first format such as an imaging mass cytometry (IMC) format (e.g., .MCD files, .TXT files, and/or the like). The digital pathology platform 110 may convert the microscopy image to a second format that is non-proprietary and vendor independent. Examples of this second format may include an Open Microscopy Environment Tag Image File Format COME. TIFF), a Tag Image File Format (TIFF), and/or the like. Converting the microscopy image to a second format may render the microscopy image more suitable for downstream processing and analysis.

At 804, the digital pathology platform 110 may segment the microscopy image to identify one or more cells present in the first biological sample. In some example embodiments, the digital pathology platform 110, for example, the segmentation engine 154, may segment the microscopy image into a plurality of segments, each of which corresponding to one cell of a plurality of cells depicted in the microscopy image. The digital pathology platform 110 may apply a variety of cell segmentation techniques including, for example, deep learning based cell segmentation techniques. For example, a machine learning model, such as a convolutional neural network, may be trained to perform per-cell segmentation. The trained machine learning model may perform per-cell segmentation by at least determining, for each pixel in the microscopy image, whether the pixel is a part of the background of the microscopy image or a part of a cell depicted in the microscopy image. This may be accomplished by the machine learning model assigning, to each pixel in the microscopy image, a star-convex polygon corresponding to the boundary of the cell to which the pixel belongs. Moreover, the machine learning model may predict, for each pixel in the microscopy image, a probability of the pixel being a part of a cell depicted in the microscopy image. The pixels that are associated with a sufficiently high probability of being part of a cell may be identified as part of a cell defined by a corresponding star-convex polygon and not a part of the background of the microscopy image.

At 806, the digital pathology platform 110 may identify, based at least on the segmented microscopy image, a cellular phenotype for each cell of a plurality of cells depicted in the microscopy image. In some example embodiments, the digital pathology platform 110, for example, the phenotyping engine 156, may determine, based at least on the segmented image, a phenotype for each cell of the plurality of cells depicted in the microscopy image. For example, the digital pathology platform 110 may identify, within the population of cells depicted in the microscopy image, a first subpopulation of cells having the first phenotype A, a second subpopulation of cells having the second phenotype B, and/or the like.

The phenotype of a cell may be determined based on cellular features such as the proteins that can be expressed by the cell and nucleic acids (e.g., DNA and/or RNA) in the cell. In some cases, the nucleic acid encodes one or more genes. In other cases, the cellular features can be transcription factors and other regulatory factors. In some cases, phenotype data indicative of cellular phenotype may be associated with a high dimensionality to account for the numerous proteins and nucleic that can be expressed by a cell. Accordingly, the digital pathology platform 110 may identify cellular phenotypes by applying one or more dimensionality reduction techniques such as principal component analysis (PCA), uniform manifold approximation and projection (UMAP), and T-distributed Stochastic Neighbor Embedding (t-SNE). Alternatively and/or additionally, the digital pathology platform 110 may identity cellular phenotypes by applying one or more cluster analysis techniques such as k-means clustering, mean-shift clustering, density-based spatial clustering of applications with noise (DB-SCAN), expectation-maximization (EM) clustering using Gaussian mixture models (GMM), and agglomerative hierarchical clustering.

At 808, the digital pathology platform 110 may determine a metric quantifying a co-occurrence pattern between a first cell type having a first cellular phenotype and a second cell type having a second cellular phenotype present in the first biological sample. In some example embodiments, the digital pathology platform 110, for example, the spatial analysis engine 158, may determine a colocation quotient indicative of whether the co-occurrence pattern between, for example, cells of the first phenotype A and cells of the second phenotype B, is attractive, avoidant, or statistically insignificant. Moreover, the colocation quotient may be indicative of a global co-occurrence pattern that is present between cells of the first phenotype A and cells of the second phenotype B across the entire biological sample. Alternatively and/or additionally, the colocation quotient may be indicative of a local co-occurrence pattern that is present in one or more portions of the biological sample. As noted, local heterogeneity may exist in the co-occurrence pattern between cells of the first phenotype A and cells of the second phenotype B in which the co-occurrence pattern present in a portion of the biological sample differs from the global co-occurrence pattern that is present across the entire biological sample.

The digital pathology platform 110 may determine the metric quantifying the co-occurrence pattern between cells of the first phenotype A and cells of the second phenotype B in a variety of ways. In one example, the metric may be an Earth Mover's Distance (EMD) quantifying a difference in a spatial distribution between cells of the first phenotype A and cells of the second phenotype B. Alternatively and/or additionally, the metric quantifying the co-occurrence pattern between cells of the first phenotype A and cells of the second phenotype B may be determined based at least on the relative spatial relationship between cells of the first phenotype A and cells of the second phenotype B. For example, the spatial analysis engine 158 may analyze the neighborhood within a radius r (e.g., x microns) of each cell of the first phenotype A to determine the presence of cells of the second phenotype B. It should be appreciated that the colocation quotient between cells of the first phenotype A and cells of the second phenotype B may retain spatial information associated with the other cellular phenotypes present in the biological sample, such as cells of the third phenotype C. In particular, the colocation quotient may account for the asymmetry in spatial correlation in which cells of the first phenotype A may be the nearest neighbors of cells of the second phenotype B but cells of the second phenotype B may be the nearest neighbors of cells of the third phenotype C not the nearest neighbors of cells of the first phenotype A.

At 810, the digital pathology platform 110 may generate, based at least on the metric, a first visual representation of the co-occurrence pattern between the first cell type and the second cell type. In some example embodiments, the digital pathology platform 110, for example, the spatial analysis engine 158, may generate the user interface 135, which may display one or more visual representations of the co-occurrence pattern between the various cellular phenotypes that are present in the biological sample including, for example, cells of the first phenotype A, cells of the second phenotype B, cells of the third phenotype C, and/or the like. One example of a visual representation may be a heatmap in which cells of the first phenotype A are depicted using a first visual indicator, cells of the second phenotype B are depicted using a second visual indicator, and cells of the third phenotype C are depicted using a third visual indicator. To enable a visual differentiation between cells of different cellular phenotypes, visual indicators may be different in color, shape, size, and/or the like.

In some example embodiments, local heterogeneity in the co-occurrence patterns between cells of the first phenotype A and cells of the second phenotype B may be visually represented by depicting cells of the second phenotype B using different visual indicators that correspond to the local co-occurrence pattern relative to cells of the first phenotype A. FIGS. 6A-6B depicts examples of the fifth heatmap 630 in which cells of the first phenotype A are depicted using a first color (and/or symbol), cells of the second phenotype B that are attractively co-located with respect to cells of the first phenotype A are depicted using a second color (and/or symbol), and cells of the second phenotype B that are avoidantly co-located with respect to cells of the first phenotype A are depicted using a third color (and/or symbol). In addition, in some instances, additional colors (and/or symbols) may be used to indicate varying magnitudes of the co-occurrence pattern. For instance, cells of the second phenotype B that exhibit a strong (e.g., above threshold) attractive co-occurrence pattern relative to cells of the first phenotype A may be displayed in the second color whereas cells of the second phenotype B that exhibit a weak (e.g., below threshold) attractive co-occurrence pattern relative to cells of the first phenotype A may be depicted using a fourth color (and/or symbol).

In some example embodiments, the user interface 135 may be interactive in that the contents of the user interface 135 may be updated in response to one or more user inputs. FIG. 6C depicts one example of interactivity in which the contents of the fifth heatmap 630 is updated in response to one or more inputs may specify a change to the zoom, magnification, and/or a field of view of the fifth heatmap 630. Another example of interactivity is shown in FIGS. 7A-7B in which the one or more user inputs specify a subset of cells present in the biological sample depicted in the microscopy image. For example, the one or more user inputs may select, in the cluster map 740, one or more clusters of cells, each of which having a different cellular phenotype. As shown in FIG. 7B, in response to the one or more user inputs, the digital pathology platform 110 may generate (or update) the user interface 135, including the first heatmap 710a, the second heatmap 710b, the third heatmap 720a, and the fourth heatmap 720b, to display a visual representation of the co-occurrence patterns associated with selected cellular phenotypes.

At 812, the digital pathology platform 110 may generate a second visual representation of a co-occurrence pattern between the first phenotype and the second phenotype in a second biological sample to enable a comparative analysis of the first biological sample and the second biological sample. In some example embodiments, the digital pathology platform 110, for example, the spatial analysis engine 158, may support a comparative analysis workflow that includes preprocessing, segmenting, phenotyping, and analyzing multiple microscopy images, each of which depicting a biological sample. In some cases, the comparative analysis may be performed between an untreated, control biological sample and a biological sample that has been subjected to a treatment. Alternatively, the comparative analysis may be performed between biological samples that have been subjected to different treatments. The comparative analysis may include a comparison of the global co-occurrence patterns and/or local co-occurrence patterns that are present in each of the first biological sample and the second biological sample.

For example, in the examples shown in FIGS. 6A-6C and 7A-7B, the user interface 135 may display visual representations of the co-occurrence patterns that are present in an untreated, control biological sample and a treated biological sample. As noted, differences in co-occurrence patterns may be attributable to the treatment that a biological sample is (or is not) subjected to. Accordingly, the comparative analysis between the different biological samples may reveal insights into how certain treatments affect a tumor microenvironment (TME) including various biological processes such as tissue formation, homeostasis, regeneration, immune response, and/or the like.

Figure 8C:
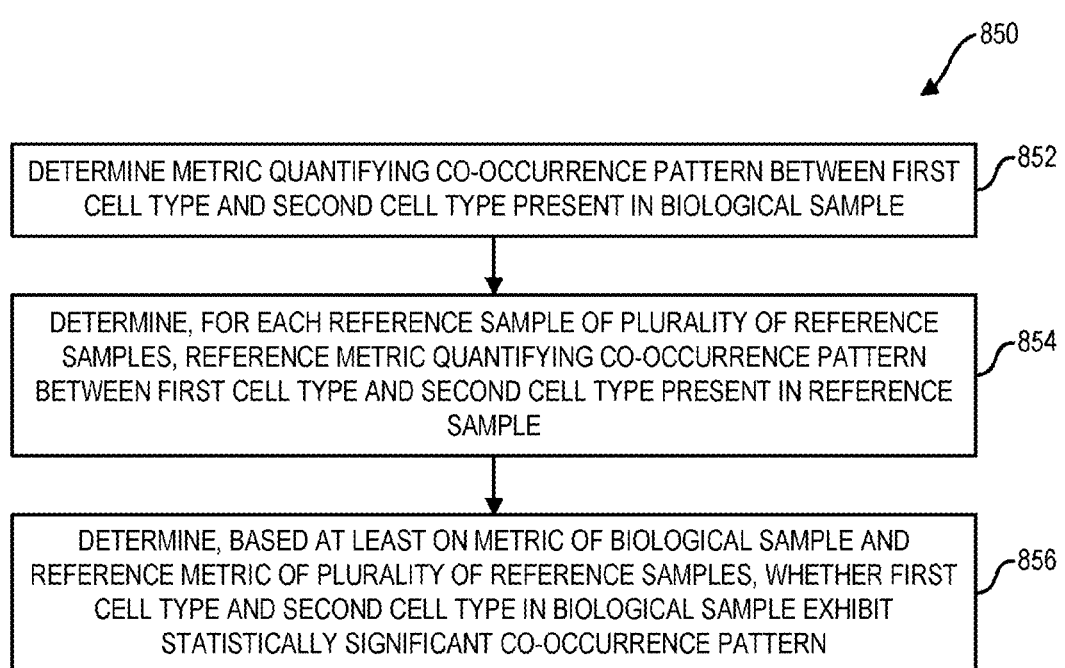
FIG. 8C depicts a flowchart illustrating another example of a process for spatial analysis, in accordance with some example embodiments.

FIG. 8C depicts a flowchart illustrating another example of a process 850 for spatial analysis, in accordance with some example embodiments. Referring to FIGS. 1 and 8C, the process 850 may be performed by the digital pathology platform 110, for example, by the spatial analysis engine 158.

At 852, the digital pathology platform 110 may determine a metric quantifying a co-occurrence pattern between a first cell type and a second cell type present in a biological sample. For example, in some example embodiments, the digital pathology platform 110 may determine a colocation quotient (CLQ) indicative of whether the co-occurrence pattern between, for example, cells of the first phenotype A and cells of the second phenotype B, is attractive, avoidant, or statistically insignificant. The colocation quotient may be indicative of a global co-occurrence pattern that is present between cells of the first phenotype A and cells of the second phenotype B across the entire biological sample. Alternatively and/or additionally, the colocation quotient may be indicative of a local co-occurrence pattern that is present in one or more portions of the biological sample.

The digital pathology platform 110 may determine the colocation quotient (CLQ), or another metric quantifying the co-occurrence pattern between cells of the first phenotype A and cells of the second phenotype B, in a variety of ways. For example, the metric may be an Earth Mover's Distance (EMD) quantifying a difference in a spatial distribution between cells of the first phenotype A and cells of the second phenotype B. Alternatively and/or additionally, the metric may be determined based at least on the relative spatial relationship between cells of the first phenotype A and cells of the second phenotype B. In the latter case, the digital pathology platform 110 may analyze the neighborhood within a radius r (e.g., x microns) of each cell of the first phenotype A to determine the presence of cells of the second phenotype B.

At 854, the digital pathology platform 110 may determine, for each reference sample of a plurality of reference samples, a reference metric quantifying a co-occurrence pattern between the first cell type and the second cell type present in the reference sample. For example, in some cases, the digital pathology platform 110 may determine, for each reference sample of several reference samples having various permutations of cells of the first phenotype A and cells of the second phenotype B, a reference metric (e.g., a colocation quotient (CLQ) and/or the like) quantifying the co-occurrence pattern between cells of the first phenotype A and cells of the second phenotype B present therein.

At 856, the digital pathology platform 110 may determine, based at least on the metric of the biological sample and the reference metric of the plurality of reference samples, whether the first cell type and the second cell type in the biological sample exhibits a statistically significant co-occurrence pattern. For example, in cases where the colocation quotient of the biological sample is below reference colocation quotient of more than a threshold quantity reference samples, the digital pathology platform 110 may determine that cells of the first phenotype A and cells of the second phenotype B in the biological sample exhibit a statistically significant attractive co-occurrence pattern. Alternatively, when colocation quotient of the biological sample does not exceed the reference colocation quotient of more than the threshold quantity of reference samples, the digital pathology platform 110 may determine that cells of the first phenotype A and cells of the second phenotype B in the biological sample exhibit a statistically significant avoidance co-occurrence pattern. Where the colocation quotient of the biological sample exceeds the reference colocation quotient or is less than the reference colocation quotient of less than the threshold quantity of reference samples, the digital pathology platform 110 may determine that cells of the first phenotype A and cells of the second phenotype B exhibit a statistically insignificant co-occurrence pattern.

Figure 11:
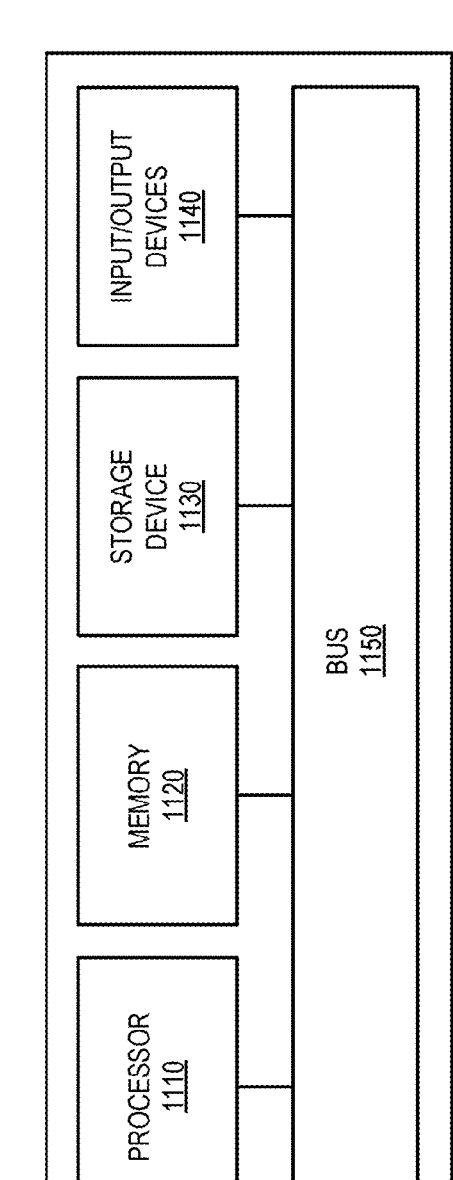
FIG. 11 depicts a block diagram illustrating an example of a computing system, in accordance with some example embodiments.

FIG. 11 depicts a block diagram illustrating an example of computing system 1100, in accordance with some example embodiments. Referring to FIGS. 1-11, the computing system 1100 may be used to implement the digital pathology platform 110, the client device 130, and/or any components therein.

As shown in FIG. 11, the computing system 1100 can include a processor 1110, a memory 1120, a storage device 1130, and input/output devices 1140. The processor 1110, the memory 1120, the storage device 1130, and the input/output devices 1140 can be interconnected via a system bus 1150. The processor 1110 is capable of processing instructions for execution within the computing system 1100. Such executed instructions can implement one or more components of, for example, the digital pathology platform 110, the client device 130, and/or the like. In some example embodiments, the processor 1110 can be a single-threaded processor. Alternately, the processor 1110 can be a multi-threaded processor. The processor 1110 is capable of processing instructions stored in the memory 1120 and/or on the storage device 1130 to display graphical information for a user interface provided via the input/output device 1140.

The memory 1120 is a computer readable medium such as volatile or non-volatile that stores information within the computing system 1100. The memory 1120 can store data structures representing configuration object databases, for example. The storage device 1130 is capable of providing persistent storage for the computing system 1100. The storage device 1130 can be a floppy disk device, a hard disk device, an optical disk device, or a tape device, or other suitable persistent storage means. The input/output device 1140 provides input/output operations for the computing system 1100. In some example embodiments, the input/output device 1140 includes a keyboard and/or pointing device. In various implementations, the input/output device 1140 includes a display unit for displaying graphical user interfaces.

According to some example embodiments, the input/output device 1140 can provide input/output operations for a network device. For example, the input/output device 1140 can include Ethernet ports or other networking ports to communicate with one or more wired and/or wireless networks (e.g., a local area network (LAN), a wide area network (WAN), the Internet).

In some example embodiments, the computing system 1100 can be used to execute various interactive computer software applications that can be used for organization, analysis and/or storage of data in various formats. Alternatively, the computing system 1100 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1140. The user interface can be generated and presented to a user by the computing system 1100 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;"

"one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory storing instructions, which when executed by the at least one data processor, cause the at least one data processor to:
   segment, into a plurality of segments, an image depicting a plurality of cells comprising a first biological sample, each segment of the plurality of segments corresponding to one cell of the plurality of cells;
   determine, based at least on the segmented image, a phenotype for each cell of the plurality of cells depicted in the image, the phenotype being determined by identifying, within the plurality of cells, a first cell type having a first phenotype and a second cell type having a second phenotype;
   determine a metric quantifying a co-occurrence pattern between the first cell type and the second cell type, the metric based on a relation between the first cell type and the second cell type within a first portion of the image and a relation between the first cell type and the second cell type within a second portion of the image, the first portion being smaller than the second portion; and
   generate, based at least on the metric, a visual representation of the co-occurrence pattern between the first cell type and the second cell type.

2. The system of claim 1, wherein the phenotype for each cell of the plurality of cells is determined by applying a dimensionality reduction technique including at least one of a principal component analysis (PCA), a uniform manifold approximation and projection (UMAP), or a T-distributed Stochastic Neighbor Embedding (t-SNE).

3. The system of claim 1, wherein the phenotype for each cell of the plurality of cells is determined by applying a cluster analysis technique including at least one of a k-means clustering, a mean-shift clustering, a density-based spatial clustering of applications with noise (DBSCAN), an expectation-maximization (EM) clustering using Gaussian mixture models (GMM), or an agglomerative hierarchical clustering.

4. The system of claim 1, wherein the phenotype for each cell of the plurality of cells is determined by based on at least one of a protein or a gene expressed by each cell of the plurality of cells.

5. The system of claim 1, wherein the metric comprises a colocation quotient determined by applying a machine learning model trained to quantify a spatial distribution between the first cell type, the second cell type, and a third cell type having a third phenotype that is also present within the plurality of cells.

6. The system of claim 1, wherein the metric comprises a colocation quotient determined by at least determining a local density of cells of the first cell type that are spatially proximate to cells of the second cell type and a global density of cells of the first cell type that are spatially proximate to cells of the second cell type, and wherein the colocation quotient corresponds to a ratio of the local density relative to the global density.

7. The system of claim 1, wherein the metric comprises an Earth Mover's Distance (EMD) quantifying a difference in a first spatial distribution of cells of the first cell type and a second spatial distribution of cells of the second cell type.

8. The system of claim 1, wherein the at least one data processor is further caused to:
   determine, based at least on the metric, a magnitude of an interaction between cells of the first cell type and cells of the second cell type, wherein the interaction comprises at least one of intercellular signaling by an endothelial growth factor (EGF) pathway, a vascular endothelial growth factor (VEGF) pathway, a growth arrest specific (GAS) pathway, a cadherin (CDH) pathway, or a cadherin 5 (CDH5) pathway; and
   identify, based at least on a probability model, at least one signaling pathway for the interaction between the first cell type and the second cell type, the probability model being determined based on a magnitude of interactions on different signaling pathways between the first cell type and the second cell type observed in control samples having various spatial permutations of the first cell type and the second cell type.

9. The system of claim 1, wherein the metric comprises at least one of:
   a global value applicable to the plurality of cells depicted in the image; or
   a local value applicable to a subset of the plurality of cells depicted in the image, wherein the subset of the plurality of cells is determined based on a radius specified by one or more user inputs.

10. The system of claim 1, the at least one data processor is further caused to:
   determine, for each of a plurality of reference samples, a reference metric, the plurality of reference samples including a plurality of distributions of the first cell type and the second cell type, and the reference metric quantifying the co-occurrence pattern between the first cell type and the second cell type present in each of the plurality of reference samples.

11. The system of claim 10, wherein the first cell type and the second cell type are determined to exhibit at least one of:
   a statistically significant attractive co-occurrence pattern based at least on the metric of the first biological sample exceeding the reference metric of more than a threshold quantity of the plurality of reference samples;

a statistically significant avoidance co-occurrence pattern based at least on the metric of the first biological sample being less than the reference metric of more than a threshold quantity of the plurality of reference samples; or a statistically insignificant co-occurrence pattern based at least on the metric of the first biological sample exceeding the reference metric or being less than the reference metric of less than a threshold quantity of the plurality of reference samples.

12. The system of claim 1, wherein:

the visual representation comprises a heatmap including one or more visual indicators corresponding to a type and/or a magnitude of the co-occurrence pattern between the first cell type and the second cell type; and the heatmap includes a first visual indicator corresponding to cells of the first cell type, a second visual indicator corresponding to cells of the second cell type that exhibit an attractive co-occurrence pattern relative to cells of the first cell type, and a third visual indicator corresponding to cells of the second cell type that exhibit an avoidance co-occurrence pattern relative to cells of the first cell type.

13. The system of claim 12, wherein at least one of:

the first visual indicator, the second visual indicator, and the third visual indicator are associated with a different color, shape, and/or size;

the second visual indicator corresponds to cells of the second cell type that exhibit an above-threshold attractive co-occurrence pattern relative to cells of the first cell type, and wherein the heatmap further includes a fourth visual indicator corresponding to cells of the second cell type that exhibit a below-threshold attractive co-occurrence pattern relative to cells of the first cell type;

the third visual indicator corresponds to cells of the second cell type that exhibit an above-threshold avoidance co-occurrence pattern relative to cells of the first cell type, and wherein the heatmap further includes a fourth visual indicator corresponding to cells of the second cell type that exhibit a below-threshold avoidance co-occurrence pattern relative to cells of the first cell type; or the first visual indicator, the second visual indicator, and the third visual indicator are superimposed over the image depicting the plurality of cells.

14. The system of claim 1, wherein:

the visual representation is generated by applying one or more dimensionality reduction techniques such that the visual representation includes a first cell cluster corresponding to the first cell type and a second cell cluster corresponding to the second cell type;

content of the visual representation is determined based on one or more inputs selecting a portion of the image including a subset of the plurality of cells; and the one or more inputs select the portion of the image by at least specifying at least one of: a zoom, a magnification level, or a field of view associated with the visual representation.

15. The system of claim 1, the at least one data processor is further caused to:

preprocess the image to convert the image from a first format to a second format, the first format being associated with an imaging system generating the image, and the second format being a non-proprietary, vendor independent format, wherein the image being preprocessed further comprises converting the image in the second format to a third format comprising at least one of a multichannel array, a global background correction, or a denoising.

16. The system of claim 1, wherein the image is segmented by at least one of:

applying a machine learning model trained to perform per-cell segmentation by at least assigning, to each pixel in the image, a cell segmentation label indicating whether the pixel is a part of a background of the image or a part of a cell depicted in the image;

applying one or more rule-based functions to identify, based at least on morphology, a false positive cell segmentation label assigned to a pixel depicting a non-cellular structure, and replacing the false positive cell segmentation label with another cell segmentation label determined by applying a watershed cell segmentation technique.

17. The system of claim 1, wherein the segmenting of the image includes at least one of:

extracting, for each cell of the plurality of cells, one or more cellular features;

generating an expression matrix having rows corresponding to the plurality of cells and columns corresponding to the one or more cellular features, and wherein the phenotype for each cell of the plurality of cells is determined based on the expression matrix; or enlarging a boundary of each cell of the plurality of cells identified within the image to include one or more cellular structures.

18. The system of claim 1, wherein the visual representation includes:

a first distribution of a gene expression profile of a first group of cells of the first cell type that exhibit a first co-occurrence pattern relative to a second group of cells of the second cell type; and a second distribution of the gene expression profile of a third group of cells of the first cell type that exhibit a second co-occurrence pattern relative to the second group of cells of the second cell type, and wherein the gene expression profile comprises an expression level of one or more specific genes.

19. A computer-implemented method, comprising:

segmenting, into a plurality of segments, an image depicting a plurality of cells comprising a first biological sample, each segment of the plurality of segments corresponding to one cell of the plurality of cells;

determining, based at least on the segmented image, a phenotype for each cell of the plurality of cells depicted in the image, the phenotype being determined by identifying, within the plurality of cells, a first cell type having a first phenotype and a second cell type having a second phenotype;

determining a metric quantifying a co-occurrence pattern between the first cell type and the second cell type, the metric based on a relation between the first cell type and the second cell type within a first portion of the image and a relation between the first cell type and the second cell type within a second portion of the image, the first portion being smaller than the second portion; and generating, based at least on the metric, a visual representation of the co-occurrence pattern between the first cell type and the second cell type.

20. A non-transitory computer readable medium storing instructions, which when executed by at least one data processor, result in operations comprising:

segmenting, into a plurality of segments, an image depicting a plurality of cells comprising a first biological sample, each segment of the plurality of segments corresponding to one cell of the plurality of cells;

determining, based at least on the segmented image, a phenotype for each cell of the plurality of cells depicted in the image, the phenotype being determined by identifying, within the plurality of cells, a first cell type having a first phenotype and a second cell type having a second phenotype;

determining a metric quantifying a co-occurrence pattern between the first cell type and the second cell type, the metric based on a relation between the first cell type and the second cell type within a first portion of the image and a relation between the first cell type and the second cell type within a second portion of the image, the first portion being smaller than the second portion; and generating, based at least on the metric, a visual representation of the co-occurrence pattern between the first cell type and the second cell type.

21. A system, comprising:

at least one data processor; and at least one memory storing instructions, which when executed by the at least one data processor, cause the at least one data processor to:

segment, into a plurality of segments, an image depicting a plurality of cells comprising a first biological sample, each segment of the plurality of segments corresponding to one cell of the plurality of cells;

determine, based at least on the segmented image, a phenotype for each cell of the plurality of cells depicted in the image, the phenotype being determined by identifying, within the plurality of cells, a first cell type having a first phenotype and a second cell type having a second phenotype, wherein the phenotype for each cell of the plurality of cells is determined by based on at least one of a protein or a gene expressed by each cell of the plurality of cells;

determine a metric quantifying a co-occurrence pattern between the first cell type and the second cell type; and generate, based at least on the metric, a visual representation of the co-occurrence pattern between the first cell type and the second cell type.

22. The system of claim 21, wherein the phenotype for each cell of the plurality of cells is determined by applying a dimensionality reduction technique including at least one of a principal component analysis (PCA), a uniform manifold approximation and projection (UMAP), or a T-distributed Stochastic Neighbor Embedding (t-SNE).

23. The system of claim 21, wherein the phenotype for each cell of the plurality of cells is determined by applying a cluster analysis technique including at least one of a k-means clustering, a mean-shift clustering, a density-based spatial clustering of applications with noise (DBSCAN), an expectation-maximization (EM) clustering using Gaussian mixture models (GMM), or an agglomerative hierarchical clustering.

24. The system of claim 21, wherein the metric comprises a colocation quotient determined by applying a machine learning model trained to quantify a spatial distribution between the first cell type, the second cell type, and a third cell type having a third phenotype that is also present within the plurality of cells.

25. The system of claim 21, wherein the metric comprises a colocation quotient determined by at least determining a local density of cells of the first cell type that are spatially proximate to cells of the second cell type and a global density of cells of the first cell type that are spatially proximate to cells of the second cell type, and wherein the colocation quotient corresponds to a ratio of the local density relative to the global density.

26. The system of claim 21, wherein the metric comprises an Earth Mover's Distance (EMD) quantifying a difference in a first spatial distribution of cells of the first cell type and a second spatial distribution of cells of the second cell type.

27. The system of claim 21, wherein the at least one data processor is further caused to determine, based at least on the metric, a magnitude of an interaction between cells of the first cell type and cells of the second cell type, wherein the interaction comprises at least one of intercellular signaling by an endothelial growth factor (EGF) pathway, a vascular endothelial growth factor (VEGF) pathway, a growth arrest specific (GAS) pathway, a cadherin (CDH) pathway, or a cadherin 5 (CDH5) pathway; and identify, based at least on a probability model, at least one signaling pathway for the interaction between the first cell type and the second cell type, the probability model being determined based on a magnitude of interactions on different signaling pathways between the first cell type and the second cell type observed in control samples having various spatial permutations of the first cell type and the second cell type.

28. The system of claim 21, wherein the metric comprises at least one of:

a global value applicable to the plurality of cells depicted in the image; or a local value applicable to a subset of the plurality of cells depicted in the image, wherein the subset of the plurality of cells is determined based on a radius specified by one or more user inputs.

29. The system of claim 21, the at least one data processor is further caused to:

determine, for each of a plurality of reference samples, a reference metric, the plurality of reference samples including a plurality of distributions of the first cell type and the second cell type, and the reference metric quantifying the co-occurrence pattern between the first cell type and the second cell type present in each of the plurality of reference samples.

30. The system of claim 29, wherein the first cell type and the second cell type are determined to exhibit at least one of:

a statistically significant attractive co-occurrence pattern based at least on the metric of the first biological sample exceeding the reference metric of more than a threshold quantity of the plurality of reference samples;

a statistically significant avoidance co-occurrence pattern based at least on the metric of the first biological sample being less than the reference metric of more than a threshold quantity of the plurality of reference samples; or a statistically insignificant co-occurrence pattern based at least on the metric of the first biological sample exceeding the reference metric or being less than the reference metric of less than a threshold quantity of the plurality of reference samples.

31. The system of claim 21, wherein:

the visual representation comprises a heatmap including one or more visual indicators corresponding to a type and/or a magnitude of the co-occurrence pattern between the first cell type and the second cell type; and the heatmap includes a first visual indicator corresponding to cells of the first cell type, a second visual indicator corresponding to cells of the second cell type that exhibit an attractive co-occurrence pattern relative to cells of the first cell type, and a third visual indicator corresponding to cells of the second cell type that exhibit an avoidance co-occurrence pattern relative to cells of the first cell type.

32. The system of claim 31, wherein at least one of:

the first visual indicator, the second visual indicator, and the third visual indicator are associated with a different color, shape, and/or size;

the second visual indicator corresponds to cells of the second cell type that exhibit an above-threshold attractive co-occurrence pattern relative to cells of the first cell type, and wherein the heatmap further includes a fourth visual indicator corresponding to cells of the second cell type that exhibit a below-threshold attractive co-occurrence pattern relative to cells of the first cell type;

the third visual indicator corresponds to cells of the second cell type that exhibit an above-threshold avoidance co-occurrence pattern relative to cells of the first cell type, and wherein the heatmap further includes a fourth visual indicator corresponding to cells of the second cell type that exhibit a below-threshold avoidance co-occurrence pattern relative to cells of the first cell type; or the first visual indicator, the second visual indicator, and the third visual indicator are superimposed over the image depicting the plurality of cells.

33. The system of claim 21, wherein:

the visual representation is generated by applying one or more dimensionality reduction techniques such that the visual representation includes a first cell cluster corresponding to the first cell type and a second cell cluster corresponding to the second cell type;

content of the visual representation is determined based on one or more inputs selecting a portion of the image including a subset of the plurality of cells; and the one or more inputs select the portion of the image by at least specifying at least one of: a zoom, a magnification level, or a field of view associated with the visual representation.

34. The system of claim 21, the at least one data processor is further caused to:

preprocess the image to convert the image from a first format to a second format, the first format being associated with an imaging system generating the image, and the second format being a non-proprietary, vendor independent format, wherein the image being preprocessed further comprises converting the image in the second format to a third format comprising at least one of a multichannel array, a global background correction, or a denoising.

35. The system of claim 21, wherein the image is segmented by at least one of:

applying a machine learning model trained to perform per-cell segmentation by at least assigning, to each pixel in the image, a cell segmentation label indicating whether the pixel is a part of a background of the image or a part of a cell depicted in the image;

applying one or more rule-based functions to identify, based at least on morphology, a false positive cell segmentation label assigned to a pixel depicting a non-cellular structure, and replacing the false positive cell segmentation label with another cell segmentation label determined by applying a watershed cell segmentation technique.

36. The system of claim 21, wherein the segmenting of the image includes at least one of:

extracting, for each cell of the plurality of cells, one or more cellular features;

generating an expression matrix having rows corresponding to the plurality of cells and columns corresponding to the one or more cellular features, and wherein the phenotype for each cell of the plurality of cells is determined based on the expression matrix; or enlarging a boundary of each cell of the plurality of cells identified within the image to include one or more cellular structures.

37. The system of claim 21, wherein the visual representation includes:

a first distribution of a gene expression profile of a first group of cells of the first cell type that exhibit a first co-occurrence pattern relative to a second group of cells of the second cell type; and a second distribution of the gene expression profile of a third group of cells of the first cell type that exhibit a second co-occurrence pattern relative to the second group of cells of the second cell type, and wherein the gene expression profile comprises an expression level of one or more specific genes.

38. A computer-implemented method, comprising:

segmenting, into a plurality of segments, an image depicting a plurality of cells comprising a first biological sample, each segment of the plurality of segments corresponding to one cell of the plurality of cells;

determining, based at least on the segmented image, a phenotype for each cell of the plurality of cells depicted in the image, the phenotype being determined by identifying, within the plurality of cells, a first cell type having a first phenotype and a second cell type having a second phenotype, wherein the phenotype for each cell of the plurality of cells is determined by based on at least one of a protein or a gene expressed by each cell of the plurality of cells;

determining a metric quantifying a co-occurrence pattern between the first cell type and the second cell type; and generating, based at least on the metric, a visual representation of the co-occurrence pattern between the first cell type and the second cell type.

39. A non-transitory computer readable medium storing instructions, which when executed by at least one data processor, result in operations comprising:

segmenting, into a plurality of segments, an image depicting a plurality of cells comprising a first biological sample, each segment of the plurality of segments corresponding to one cell of the plurality of cells;

determining, based at least on the segmented image, a phenotype for each cell of the plurality of cells depicted in the image, the phenotype being determined by identifying, within the plurality of cells, a first cell type having a first phenotype and a second cell type having a second phenotype, wherein the phenotype for each cell of the plurality of cells is determined by based on at least one of a protein or a gene expressed by each cell of the plurality of cells;

determining a metric quantifying a co-occurrence pattern between the first cell type and the second cell type; and generating, based at least on the metric, a visual repre-
sentation of the co-occurrence pattern between the first
cell type and the second cell type.

*    *    *    *    *